US011266006B2

(12) United States Patent
Saverskiy

(10) Patent No.: US 11,266,006 B2
(45) Date of Patent: Mar. 1, 2022

(54) METHOD AND SYSTEM FOR TIMING THE INJECTIONS OF ELECTRON BEAMS IN A MULTI-ENERGY X-RAY CARGO INSPECTION SYSTEM

(71) Applicant: American Science and Engineering, Inc., Billerica, MA (US)

(72) Inventor: Aleksandr Saverskiy, North Andover, MA (US)

(73) Assignee: American Science and Engineering, Inc., Billerica, MA (US)

( * ) Notice: Subject to any disclaimer, the term of this patent is extended or adjusted under 35 U.S.C. 154(b) by 299 days.

(21) Appl. No.: 16/553,496

(22) Filed: Aug. 28, 2019

(65) Prior Publication Data

US 2019/0387608 A1 Dec. 19, 2019

Related U.S. Application Data

(63) Continuation-in-part of application No. 16/442,256, filed on Jun. 14, 2019, now abandoned, which is a
(Continued)

(51) Int. Cl.
*H05G 2/00* (2006.01)
*H05H 9/04* (2006.01)
(Continued)

(52) U.S. Cl.
CPC .............. *H05H 9/048* (2013.01); *H01J 35/14* (2013.01); *H05H 7/02* (2013.01); *H05H 7/08* (2013.01);
(Continued)

(58) Field of Classification Search
CPC ........ G01V 5/0041; H01J 35/14; H01J 35/00; H05G 2/00; H05H 2007/025;
(Continued)

(56) References Cited

U.S. PATENT DOCUMENTS 5,168,241 A 12/1992 Hirota
5,910,973 A 6/1999 Grodzins
(Continued)

FOREIGN PATENT DOCUMENTS

EP 0672332 B1 2/2000
JP 201351156 A 3/2013

OTHER PUBLICATIONS

Miller, "Comparison of Standing-Wave and Travelling-Wave Structures", SLAC Linear Accelerator Conferernce, (1986).
(Continued)

*Primary Examiner* — Wyatt A Stoffa
(74) *Attorney, Agent, or Firm* — Novel IP

(57) ABSTRACT

Embodiments of the disclosed system and method provide for generating a multiple-energy X-ray pulse. A beam of electrons is generated with an electron gun and modulated prior to injection into an accelerating structure to achieve at least a first and second specified beam current amplitude over the course of respective beam current temporal profiles. A radio frequency field is applied to the accelerating structure with a specified RF field amplitude and a specified RF temporal profile. The first and second specified beam current amplitudes are injected serially, each after a specified delay, in such a manner as to achieve at least two distinct energies of electrons accelerated within the accelerating structure during a course of a single RF-pulse. The beam of electrons is accelerated by the radio frequency field within the accelerating structure to produce accelerated electrons which impinge upon a target for generating Bremsstrahlung X-rays.

35 Claims, 19 Drawing Sheets

Related U.S. Application Data continuation of application No. 15/832,369, filed on Dec. 5, 2017, now Pat. No. 10,368,428, which is a continuation of application No. 15/307,463, filed as application No. PCT/US2015/030716 on May 14, 2015, now Pat. No. 9,867,271.

(60) Provisional application No. 62/855,713, filed on May 31, 2019, provisional application No. 61/994,484, filed on May 16, 2014.

(51) Int. Cl.

| | |
|---|---|
| H05H 7/02 | (2006.01) |
| H05H 7/08 | (2006.01) |
| H01J 35/14 | (2006.01) |
| H05H 7/12 | (2006.01) |
| H01J 35/00 | (2006.01) |
| G01V 5/00 | (2006.01) |

(52) U.S. Cl.
CPC .............. H05H 7/12 (2013.01); H05H 9/04 (2013.01); G01V 5/0041 (2013.01); H01J 35/00 (2013.01); H05G 2/00 (2013.01); H05H 2007/025 (2013.01); H05H 2007/084 (2013.01)

(58) Field of Classification Search
CPC ...... H05H 2007/084; H05H 7/02; H05H 7/08; H05H 9/04; H05H 9/048; H05H 7/12
See application file for complete search history.

(56) References Cited

U.S. PATENT DOCUMENTS

| | | | |
|---|---|---|---|
| 5,940,468 A | 8/1999 | Huang | |
| 6,067,344 A | 5/2000 | Grodzins | |
| 6,081,580 A | 6/2000 | Grodzins | |
| 6,151,381 A | 11/2000 | Grodzins | |
| 6,192,104 B1 | 2/2001 | Adams | |
| 6,292,533 B1 | 9/2001 | Swift | |
| 6,320,933 B1 | 11/2001 | Grodzins | |
| 6,424,695 B1 | 7/2002 | Grodzins | |
| 6,459,761 B1 | 10/2002 | Grodzins | |
| 6,546,072 B1 | 4/2003 | Chalmers | |
| 6,658,087 B2 | 12/2003 | Chalmers | |
| 7,010,094 B2 | 3/2006 | Grodzins | |
| 7,099,434 B2 | 8/2006 | Adams | |
| RE39,396 E | 11/2006 | Swift | |
| 7,218,704 B1 | 5/2007 | Adams | |
| 7,400,701 B1 | 7/2008 | Cason | |
| 7,505,556 B2 | 3/2009 | Chalmers | |
| 7,538,325 B2 | 5/2009 | Mishin | |
| 7,555,099 B2 | 6/2009 | Rothschild | |
| 7,593,506 B2 | 9/2009 | Cason | |
| 7,593,510 B2 | 9/2009 | Rothschild | |
| 7,646,851 B2 | 1/2010 | Liu | |
| 7,864,920 B2 | 1/2011 | Rothschild | |
| 7,995,707 B2 | 8/2011 | Rothschild | |
| 8,284,898 B2* | 10/2012 | Ho | H05H 7/12 378/119 |
| 8,325,871 B2 | 12/2012 | Grodzins | |
| 8,345,819 B2 | 1/2013 | Mastronardi | |
| 8,439,565 B2 | 5/2013 | Mastronardi | |
| 8,442,186 B2 | 5/2013 | Rothschild | |
| 8,457,274 B2 | 6/2013 | Arodzero | |
| 8,503,606 B2 | 8/2013 | Rothschild | |
| 8,532,823 B2 | 9/2013 | McElroy | |
| 8,604,723 B2* | 12/2013 | Chen | H05H 9/00 315/505 |
| 8,690,427 B2 | 4/2014 | Mastronardi | |
| 8,824,632 B2 | 9/2014 | Mastronardi | |
| 8,842,808 B2 | 9/2014 | Rothschild | |
| 8,861,684 B2 | 10/2014 | Al-Kofahi | |
| 8,971,487 B2 | 3/2015 | Mastronardi | |
| 9,014,339 B2 | 4/2015 | Grodzins | |
| 9,020,103 B2 | 4/2015 | Grodzins | |
| 9,052,271 B2 | 6/2015 | Grodzins | |
| 9,099,279 B2 | 8/2015 | Rommel | |
| 9,117,564 B2 | 8/2015 | Rommel | |
| 9,146,201 B2 | 9/2015 | Schubert | |
| 9,257,208 B2 | 2/2016 | Rommel | |
| 9,285,488 B2 | 3/2016 | Arodzero | |
| 9,291,582 B2 | 3/2016 | Grodzins | |
| 9,417,060 B1 | 8/2016 | Schubert | |
| 9,466,456 B2 | 10/2016 | Rommel | |
| 9,535,019 B1 | 1/2017 | Rothschild | |
| 9,541,510 B2 | 1/2017 | Arodzero | |
| 9,622,333 B2* | 4/2017 | Nighan, Jr | H05H 9/048 |
| 9,658,343 B2 | 5/2017 | Arodzero | |
| 9,867,271 B2 | 1/2018 | Saverskiy | |
| 10,228,487 B2 | 3/2019 | Mastronardi | |
| 10,368,428 B2 | 7/2019 | Saverskiy | |
| 10,720,300 B2* | 7/2020 | Rommel | H01J 35/147 |
| 10,955,367 B2* | 3/2021 | Couture | B25J 9/1628 |
| 2007/0140422 A1* | 6/2007 | Elyan | H05H 15/00 378/57 |
| 2007/0170375 A1* | 7/2007 | Tang | H05G 2/00 250/493.1 |
| 2008/0211431 A1* | 9/2008 | Mishin | H05H 9/00 315/505 |
| 2010/0066256 A1* | 3/2010 | Meddaugh | H05H 7/12 315/156 |
| 2010/0188027 A1* | 7/2010 | Treas | H05H 9/02 315/505 |
| 2012/0081042 A1* | 4/2012 | Cheung | H05H 7/02 315/505 |
| 2012/0206069 A1* | 8/2012 | Zavadtsev | G21K 5/04 315/501 |
| 2012/0294423 A1* | 11/2012 | Cheung | H05H 7/12 378/65 |
| 2012/0313555 A1 | 12/2012 | Ho | |
| 2013/0016814 A1* | 1/2013 | Treas | H05H 7/12 378/106 |
| 2013/0063052 A1* | 3/2013 | Ho | H05H 7/12 315/505 |
| 2014/0029725 A1 | 1/2014 | Ueda | |
| 2014/0211919 A1 | 7/2014 | Ogura | |
| 2014/0270086 A1* | 9/2014 | Krasnykh | G01N 23/083 378/124 |
| 2018/0368248 A1 | 12/2018 | Saverskiy | |

OTHER PUBLICATIONS

Gao, "Analytical formula for the coupling coefficient Beta of a cavity waveguide coupling system", Physics Research A, vol. 309, pp. 5-10 (1991).
Gijeong Jang, Authorized officer, Korean Intellectual Property Office, International Search Report—Application No. PCT/US2015/030716, dated Jul. 29, 2015, 11 pages, together with the Written Opinion of the International Searching Authority.
Ogorodnikov et al., "Processing of interlaced images in 4-10 MeV dual energy customs system for material recognition", Phys. Rev. Special Topics—Accelerators and Beam, vol. 5, 104701 (2002).
Krasnykh et al., "Concept of RF Linac for Intra-Pulse Multi-Energy Scan", SLAC Pub-15943, (Apr. 18, 2014).

* cited by examiner

METHOD AND SYSTEM FOR TIMING THE INJECTIONS OF ELECTRON BEAMS IN A MULTI-ENERGY X-RAY CARGO INSPECTION SYSTEM

CROSS-REFERENCE

The present application relies on U.S. Patent Provisional Application No. 62/855,713, entitled "Method and System for Timing the Injections of Electron Beams in a Multi-Energy X-Ray Cargo Inspection System", filed on May 31, 2019, for priority.

The present application is a continuation-in-part of U.S. patent application Ser. No. 16/442,256, entitled "Source for Intra-Pulse Multi-Energy X-Ray Cargo Inspection", and filed on Jun. 14, 2019, which is a continuation of U.S. Pat. No. 10,368,428, entitled "Source for Intra-Pulse Multi-Energy X-Ray Cargo Inspection", filed on Dec. 5, 2017 and issued on Jul. 30, 2019, which, in turn, is a continuation of U.S. Pat. No. 9,867,271, of the same title, filed on Oct. 28, 2016 and issued on Jan. 9, 2018, which, in turn, is a 35 USC 371(c) National Stage Entry of PCT/US15/30716, filed on May 14, 2015, which, in turn, relies on U.S. Patent Provisional Application No. 61/994,484, of the same title and filed on May 16, 2014.

FIELD

The invention relates generally to systems and methods for inspection of cargo using penetrating radiation, and, more specifically to systems and methods for material discrimination on the basis of varying both the energy and the flux of incident radiation during the course of a single pulse.

BACKGROUND

Discrimination of materials has become a standard requirement for security inspection systems. An inspection system for cargo and containers screening typically employs an electron accelerator capable of interlaced dual energy operation, and differential transmission of X-rays characterized by distinct energy spectra can be used to distinguish among intervening materials of different atomic numbers. The term "interlaced energies," as employed herein, denotes the use of a stream of X-ray pulses wherein successive pulses are characterized by distinct energy spectra. The use of interlaced energy inspection for material discrimination is well known, with processing techniques surveyed, for example, by Ogorodnikov et al., Processing of interlaced images in 4-10 MeV dual energy customs system for material recognition, Phys. Rev. Special Topics-Accelerators and Beams, vol. 5, 104701 (2002), and in references cited therein, all of which are incorporated herein by reference. A Bremsstrahlung spectrum is characterized by its endpoint energy, defined by the energy of electrons impinging upon an X-ray target in order to generate the X-rays. Attenuation by an inspected object of transmitted radiation for two (or, on some occasions, more) distinct energies provides the input data for identifying the type of material being inspected.

Various techniques are known for generating X-rays of interlaced energies based on electron accelerators, such as described, for example, in U.S. Pat. No. 7,646,851, entitled "Device and Method for generating X-Rays Having Different Energy Levels and Material Discrimination System," and U.S. Pat. No. 8,604,723, entitled "Interlaced multi-energy radiation sources," both of which are incorporated herein by reference. The technologies of interlaced energy irradiation merit no further discussion here, since they are irrelevant to the present specification, other than to highlight their deficiencies for purposes of cargo inspection.

Several limitations accompany material discrimination functionality when a source of interlaced X-ray energy is employed. Using two pulses separated in time for producing one inspection data point effectively reduces inspection speed. Moreover, while the basic assumption of dual-energy techniques is that the same region of the cargo is being probed by both energies, it must be borne in mind that the cargo and the probe are typically in relative motion. Interlaced energy approaches are thus only tenable for slow moving cargo.

X-ray security inspection systems for the inspection of cargo and shipping containers typically use transmission radiographic techniques. FIG. 1 depicts a cargo inspection system employing such a technique. A fan-shaped beam 12 of penetrating radiation, emitted by a source 14, is detected by elements 18 of a detector array 16 distal to a target object, here truck 10, is used to produce images of the target object. Detector elements 18 produce corresponding detector signals processed by processor 19 to provide information relative to the material composition of the cargo and images of its spatial distribution. The thickness of material to be penetrated by the X-rays may exceed 300 mm of steel equivalent in some cases. To insure the required penetration, inspection systems typically use X-rays with a maximum energy of several MeV, currently up to about 9 MeV. X-rays in excess of 1 MeV are frequently referred to as hard X-rays or high-energy X-rays.

Information (such as mass absorption coefficient, effective atomic number $Z_{eff}$, electron density, or the spatial distribution of any of the foregoing, etc.) with respect to the material composition of the contents of objects may be obtained on the basis of the interaction of X-rays with the material, and, more particularly, by illuminating the material with X-ray beams having energy spectra with more than one distinct energy endpoint (peak energy), or by employing energy discriminating detectors. Dual energy methods of material discrimination are widely used in X-ray inspection systems for security control of hand luggage in customs and other security checkpoints.

Dual (and, more generally, multiple-) energy methods have been extended to high-energy inspection systems for cargo containers, where material discrimination is less effective due to the weaker Z-dependence of the dominant interaction.

In the practice of dual-energy inspection, X-ray transmission data of an inspected object are obtained for both energies, and processed by computer, whereupon a resulting image is displayed on a monitor, typically in a special color palette that facilitates visual identification of contraband or hazardous materials. More particularly, special computer software may identify various materials and artificial colors may be assigned to various values of $Z_{eff}$.

A typical energy range for the inspection of smaller objects is below 0.5 MeV, taking advantage of the strong Z-dependence of the X-ray attenuation coefficient due to the prevalence of the photoelectric interaction (characterized by a cross-section, $\sim Z^4 - Z^5$) at lower energies. In the range of 1-10 MeV, however, X-ray interaction is dominated by the Compton effect with its weak dependence of attenuation coefficient (mass absorption) on the atomic number: $\mu_c \sim Z/A$ (which is approximately constant and equal to 0.5), where Z denotes atomic number, and A denotes atomic mass, which is to say that the mass absorption coefficient is largely Z-insensitive in the energy regime dominated by Compton scatter.

A preferred method for material discrimination entails variation of the pulse energy during the course of each single pulse, as described in detail in U.S. Pat. No. 8,457,274 ("Arodzero '274", issued Jun. 4, 2013), which is incorporated herein by reference.

Leó Szilárd conceived of the linear accelerator (linac) in 1928, while a professor at the University of Berlin. A linac was also constructed independently by Rolf Widerøe, then an engineering graduate-student under Walter Rogowski at Aachen, at about the same time. Electrons accelerated by a linear accelerator were first used to generate X-rays at Stanford in the mid-1950's.

Some prior art methods for varying the emitted energy during the course of a pulse have required that the x-ray flux track the end-point energy. The Arodzero '274 patent, for example, states that "Concurrently with the sweeping of the endpoint energy, the X-ray flux may increase from a minimum to a maximum." (Arodzero '274, col. 6, lines 47-48.)

US Published Patent Application 2014/0270086 (to Krasnykh), incorporated herein by reference, describes an intra-pulse multi-energy method that uses a traveling wave accelerator structure. It suggests the use of feedback to the electron gun grid voltage to compensate for X-ray flux variation during the course of a pulse. Krasnykh et al., Concept of RF Linac for Intra-Pulse Multi-Energy Scan, SLAC Pub-15943, (Apr. 18, 2014) provides further description, and is also incorporated herein by reference. The prior art mode of operation, however, could not accommodate separate tailoring of the flux and end-point energy of an X-ray pulse, even though such operation would be highly advantageous in a cargo inspection context, for example.

One of the limiting factors of inspection speed is RF-power available for accelerating. The maximum pulse repetition frequency (PRF) that a linac-based X-ray source can provide is limited by the RF source. The RF source (typically, a magnetron or a klystron) has limitations on maximum average $P_{av,max}$ and pulsed $P_{p,max}$ power. These two parameters define the maximum duty factor $d_{max}$, which also can be expressed in terms of PRF (f) and pulse duration $t_p$:

$$d_{max} = \frac{P_{av,max}}{P_{p,max}} = f \cdot t_p \quad (1)$$

For example, where a single energy (SE) (non-interlaced) accelerator, characterized by, $P_{p,max}$, is chosen to produce the high energy (HE) pulse, with $t_p \approx 3.3$ μs and $d_{max} \approx 0.001$, the maximum PRF would be limited to $f_H \approx 300$ Hz (pps).

For a dual-energy interlaced linac, the maximum available frequency can be estimated from the equation $$f_{DE} \approx \frac{P_{av,max}}{P_H \cdot t_p \cdot \left(1 + \frac{P_L}{P_H}\right)} = \frac{f_H}{\left(1 + \frac{P_L}{P_H}\right)} \quad (2)$$

where $P_H$ and $P_L$ represent the RF power necessary to produce high (HE) and low (LE) energy pulses, respectively. If the assumption is made that $t_p$ remains the same for both energies, and that $P_H = P_{p,max}$, then, for $P_L = P_H$ (RF-power remaining constant for both pulses, achieved, for example, by RF-switches/regulators, manipulation of beam loading, and phase-shifting of the accelerating field), $f_{DE} = \frac{1}{2} \cdot f_H$. In other words, a dual energy repetition rate of, at best, half that of the single-energy rate, may be achieved. On the other hand, if the low-energy pulses produce only half the power of the high-energy pulses, $P_L = \frac{1}{2} P_H$, (as might be implemented using RF-generator power supply modulation, for example), then $f_{DE} = \frac{2}{3} \cdot f_H$, which is to say that $\frac{2}{3}$ of the single-energy pulse rate may be achieved on an interlaced energy basis.

In prior practice, both the RF-power and the injected beam were turned on at the same time ($t_b = 0$). The result of such prior art practice is shown by a dotted curve 30 plotted in FIG. 3, which represents the beam energy W vs. time t for a 6-MeV accelerating structure designed for security applications. The filling time, which is the time it takes for the electric field in the accelerator structure to decay to $e^{-1}$ of its initial value, is $t_{f,95\%} \approx 1$ μs.

A well-known technical solution for reducing the filling time was described by Roger Miller, Comparison of Standing-Wave and Travelling-Wave Structures, SLAC Linear Accelerator Conference, SLAC-PUB-3935, pp. 216-21 (1986) (hereinafter, "Miller (1986)", which is incorporated herein by reference. The Miller solution allows for creating the beam pulse with constant energy over the pulse duration. The accelerating beam turns on with delay $t_b$ that is defined as:

$$t_b = \tau \cdot \ln\left(\frac{\sqrt{4\beta rLP}}{IrL}\right) \quad (3)$$

β is the coupling coefficient between an RF power feed waveguide 222 (shown in FIG. 2) and an accelerating structure 22 (shown in FIG. 2, also referred to herein as an "accelerating cavity structure"), r is the shunt impedance of the accelerating structure 22, L is the length of the accelerating structure 22, and P is the power dissipated in the accelerating structure 22, and r is the decay time constant of the accelerating structure 22. (Thus, both numerator and denominator of the logarithmic argument have units of voltage.) Rigorously, β is defined as the ratio of power lost outside the accelerating cavity structure 22 (i.e., in the feed waveguide 222) to the power dissipated inside the accelerating cavity structure 22. If $\beta = \beta_0$ has been adjusted so that there is no RF-power reflection from the accelerating structure 22 when the beam 220 is on, the above equation can be cast as:

$$t_b = \tau \cdot \ln\left(\frac{2 \cdot \beta_0}{\beta_0 - 1}\right) \quad (4)$$

where $\beta_0$ is the optimum coupling coefficient $$\beta_0 = \left(\frac{I}{2}\sqrt{\frac{rL}{P}} + \sqrt{1 + \frac{I^2}{4}\frac{rL}{P}}\right)^2 \quad (5)$$

and τ, as above, is the decay time constant of the accelerating structure 22.

As known to persons of ordinary skill in the art, the coupling coefficient (β) of the accelerating structure 220 (also referred to as an "accelerating resonator," or a "resonator," or "RF accelerating structure") to the external circuit (feeding waveguide 222) depends on the current accelerated in (and interacting with) the resonator 220. Typically, the presence of current decreases the coupling coefficient that is measured through VSWR (voltage standing wave ratio), and the phase of the reflected signal from the resonator 220. Initially (without current), the resonator 220 needs to be over-coupled and to have a coupling coefficient of greater than $\beta=1$. The optimum coupling coefficient $\beta_0$ is a value that allows the resonator 220 to be matched with an external waveguide 222 at the accelerating current I. When the coupling coefficient $\beta$ is equal to $\beta_0$, the coupling is referred to herein as "optimal." An exact calculation of the optimum $\beta_0$ may be found by reference to Sobenin et al., Electrodynamic Characteristics of Accelerating Cavities (Eng. trans.), CRC Press, particularly at p. 121 (Eqn. 4.49), (1999), Collin, Foundations for Microwave Engineering, McGraw-Hill, (1st ed., 1992), and Gao. Analytical formula for the coupling coefficient $\beta$ of a cavity waveguide coupling system, Physics Research A, vol. 309, pp. 5-10 (1991), all of which are incorporated herein by reference.

In practice of designing accelerating systems the resonator 220 must be over-coupled (coupling coefficient $\beta_c>1$, also $\beta_c \geq \beta_0$) for all values of accelerating current (I) and RF-power (P) considered for operation. Otherwise, operation of accelerating structure 22 becomes unstable. In some cases, waveguides are designed to be close to the optimum coupling, while there are cases when waveguide is designed for broad area of applications and is noticeably over-coupled when it operates at "low-current" applications.

Embodiments of the present specification provide improvements over traditional interlaced systems of material discrimination with dynamic dose control employed. U.S. Pat. No. 8,054,937, titled "Systems and methods for using an intensity-modulated X-ray source", assigned to the applicant, and incorporated herein by reference, describes embodiments of a traditional system of material discrimination with dynamic dose control.

Material discrimination is frequently achieved by applying dual/multi-energy method; with interlacing pulses of different energy; or by forming dual/multi-energy structure within single microwave pulses. Dynamic dose control is typically achieved by independently varying pulse duration of each energy spectrum component. There is a need for successful operation of such a system (with material discrimination and dynamic dose control) that the energy spectrum of each energy component must be constant while dose is varying due to change of the pulse duration within the range of defined values (from minimum to maximum).

U.S. Pat. No. 9,867,271, titled "Source for intra-pulse multi-energy X-ray cargo inspection", assigned to the applicant, and related to the present specification, describes the method of forming the beams satisfied to these conditions by injecting the beams with specific timing delays. One of the key assumptions of the method is in matching system for optimal coupling at the Low Energy/First (highest) beam current. Methods for material discrimination are provided on the basis of varying both the energy and the flux of incident radiation during the course of a single pulse. A beam of electrons is generated with an electron gun and modulated prior to injection into an accelerating structure to achieve at least a first and specified beam current amplitude over the course of respective beam current temporal profiles. A radio frequency field is applied to the accelerating structure with a specified RF field amplitude and a specified RF temporal profile. The first and second specified beam current amplitudes are injected serially, each after a specified delay, in such a manner as to achieve at least two distinct endpoint energies of electrons accelerated within the accelerating structure during a course of a single RF-pulse. The beam of electrons is accelerated by the radio frequency field within the accelerating structure to produce accelerated electrons which impinge upon a target for generating Bremsstrahlung X-rays. There is a further need to address practical aspects of forming X-ray beam that may simultaneously support material discrimination and dynamic dose control functions.

SUMMARY

The following embodiments and aspects thereof are described and illustrated in conjunction with systems, tools and methods, which are meant to be exemplary and illustrative, and not limiting in scope. The present application discloses numerous embodiments.

In embodiments, the present specification discloses a method for generating a multiple-energy X-ray pulse using an accelerating structure comprising a standing wave resonator, the method comprising: generating a beam of electrons with an electron gun; modulating the beam of electrons prior to injection into the accelerating structure, wherein modulating the beam of electrons produces at least 1) a first beam current amplitude and a first beam current temporal profile and 2) a second beam current amplitude and a second beam current temporal profile and wherein the beam of electrons is characterized by an electron beam pulse duration; applying to the accelerating structure a radio frequency field, wherein the radio frequency field is defined by RF field amplitude, a specified temporal profile, and an RF pulse duration; determining a temporal profile of an amount of power reflected from the accelerating structure; determining a first delay and a second delay, wherein each of the first delay and second delay is determined based, at least in part, on the temporal profile of the amount of power reflected from the accelerating structure; injecting the modulated beam of electrons at the first beam current amplitude after the first delay to achieve a first sub-pulse and then at the second beam current amplitude after the second delay to achieve a second sub-pulse, wherein the injecting is configured to achieve a first steady state energy level for the first sub-pulse and a second steady state energy level for the second sub-pulse and wherein the first steady state energy level and the second steady state energy level are different; accelerating the modulated beam of electrons with the radio frequency field within the accelerating structure to produce accelerated electrons; and impinging the accelerated electrons upon a target for generating X-rays by Bremsstrahlung.

Optionally, the method further comprises optimizing a coupling coefficient for the accelerating structure, wherein the coupling coefficient is optimized to achieve greater than critical coupling at any beam current.

Optionally, the injecting of the modulated beam of electrons at the first beam current amplitude and then at the second beam current amplitude occurs over a single RF pulse. Optionally, the injecting of the modulated beam of electrons is performed at a time that is based, at least in part, on achieving, during the first sub-pulse, a minimized deviation of energy level relative to the first steady state energy level and on achieving, during the second sub-pulse, a minimized deviation of energy level relative to the second steady state energy level.

Optionally, a duration of the first sub-pulse is different from a duration of the second sub-pulse. Optionally, at least one of a duration of the first sub-pulse or a duration of the second sub-pulse is variable, wherein a minimum duration of any sub-pulse may be zero, and wherein a maximum duration of the first sub-pulse or a maximum duration of the second sub-pulse is defined by a function of the RF pulse duration, a time for the injecting of the modulated beam of electrons, and durations of one or more other sub-pulses.

Optionally, the injecting of the modulated beam of electrons is performed at a time that is based, at least in part, on achieving, during the first sub-pulse, a minimized deviation of power magnitude reflected from the accelerating structure relative to a first steady state level of reflected power magnitude and on achieving, during the second sub-pulse, a minimized deviation of power magnitude reflected from the accelerating structure relative to a second steady state level of reflected power magnitude.

Optionally, a duration of the first sub-pulse is different from a duration of the second sub-pulse. Optionally, at least one of a duration of the first sub-pulse or a duration of the second sub-pulse is variable, wherein a minimum duration of any sub-pulse may be zero, and wherein a maximum duration of the first sub-pulse or a maximum duration of the second sub-pulse is defined by a function of the RF pulse duration, a time for the injecting of the modulated beam of electrons, and durations of one or more other sub-pulses.

Optionally, the injecting of the modulated beam of electrons is performed at a time that is based, at least in part, on achieving, during the first sub-pulse, a minimized deviation of a normalized X-ray beam intensity, on the pulse duration, for the first sub-pulse relative to an X-ray beam intensity corresponding to the steady state energy level of the first sub-pulse and on achieving, during the second sub-pulse, a minimized deviation of a normalized X-ray beam intensity, on the pulse duration, for the second sub-pulse relative to an X-ray beam intensity corresponding to the steady state energy level of the second sub-pulse.

Optionally, a duration of the first sub-pulse is different from a duration of the second sub-pulse. Optionally, at least one of a duration of the first sub-pulse or a duration of the second sub-pulse is variable, wherein a minimum duration of any sub-pulse may be zero, and wherein a maximum duration of the first sub-pulse or a maximum duration of the second sub-pulse is defined by a function of the RF pulse duration, a time for the injecting of the modulated beam of electrons, and durations of one or more other sub-pulses.

In embodiments, the present specification discloses a system for generating a multiple-energy X-ray pulse, the system comprising: an electron gun configured to generate a beam of electrons; a standing wave resonator; an RF source configured to apply a radio frequency field to the standing wave resonator, wherein the radio frequency field is characterized by a RF-field amplitude, a specified temporal profile, and a RF pulse duration and wherein the standing wave resonator is configured to receive and accelerate the beam of electrons with the radio frequency field to produce accelerated electrons; at least one detector configured to generate data indicative of a temporal profile of an amount of power reflected from the accelerating structure and to generate values indicative of amounts of reflected power; a controller configured to 1) receive the values indicative of the amounts of reflected power from the at least one detector, 2) determine the temporal profile of the amount of reflected power, 3) determine a first delay and a second delay, wherein each of the first delay and second delay is determined based, at least in part, on the temporal profile of the amount of reflected power, and 4) inject the beam of electrons into the standing wave resonator to produce the accelerated electrons and form at least a first sub-pulse defined by a first beam current amplitude and a first RF-field amplitude and a second sub-pulse defined by a second beam current amplitude and a second RF-field amplitude, wherein the injecting is conducted to achieve a first steady state energy level for the first sub-pulse and a second steady state energy level for the second sub-pulse that are different; and a target configured to receive the accelerated electrons and generate the multiple-energy X-ray pulse.

Optionally, the at least one detector comprises a directional coupler and microwave detector.

Optionally, the controller is configured to inject the beam of electrons at the first beam current amplitude after the first delay to achieve the first sub-pulse and then at the second beam current amplitude after the second delay to achieve the second sub-pulse over a single RF pulse. Optionally, the controller is configured to inject the beam of electrons at a time that is based, at least in part, on achieving, during the first sub-pulse, a minimized deviation of energy level relative to the first steady state energy level and on achieving, during the second sub-pulse, a minimized deviation of energy level relative to the second steady state energy level.

Optionally, a duration of the first sub-pulse is different from a duration of the second sub-pulse. Optionally, at least one of a duration of the first sub-pulse or a duration of the second sub-pulse is variable, wherein a minimum duration of any sub-pulse may be zero, and wherein a maximum duration of the first sub-pulse or a maximum duration of the second sub-pulse is defined by a function of the RF pulse duration, a time for injecting the beam of electrons, and durations of one or more other sub-pulses.

Optionally, the controller is configured to inject the beam of electrons at a time that is based, at least in part, on achieving, during the first sub-pulse, a minimized deviation of power magnitude reflected from the standing wave resonator relative to a first steady state level of reflected power magnitude and on achieving, during the second sub-pulse, a minimized deviation of power magnitude reflected from the standing wave resonator relative to a second steady state level of reflected power magnitude.

Optionally, a duration of the first sub-pulse is different from a duration of the second sub-pulse. Optionally, at least one of a duration of the first sub-pulse or a duration of the second sub-pulse is variable, wherein a minimum duration of any sub-pulse may be zero, and wherein a maximum duration of the first sub-pulse or a maximum duration of the second sub-pulse is defined by a function of the RF pulse duration, a time for injecting of the beam of electrons, and durations of one or more other sub-pulses.

Optionally, the controller is configured to inject the beam of electrons at a time that is based, at least in part, on achieving, during the first sub-pulse, a minimized deviation of a normalized X-ray beam intensity, on the pulse duration, for the first sub-pulse relative to an X-ray beam intensity corresponding to the steady state energy level of the first sub-pulse and on achieving, during the second sub-pulse, a minimized deviation of a normalized X-ray beam intensity, on the pulse duration, for the second sub-pulse relative to an X-ray beam intensity corresponding to the steady state energy level of the second sub-pulse.

Optionally, a duration of the first sub-pulse is different from a duration of the second sub-pulse. Optionally, at least one of a duration of the first sub-pulse or a duration of the second sub-pulse is variable, wherein a minimum duration of any sub-pulse may be zero, and wherein a maximum duration of the first sub-pulse or a maximum duration of the second sub-pulse is defined by a function of the RF pulse duration, a time for injecting of the beam of electrons, and durations of one or more other sub-pulses.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1:
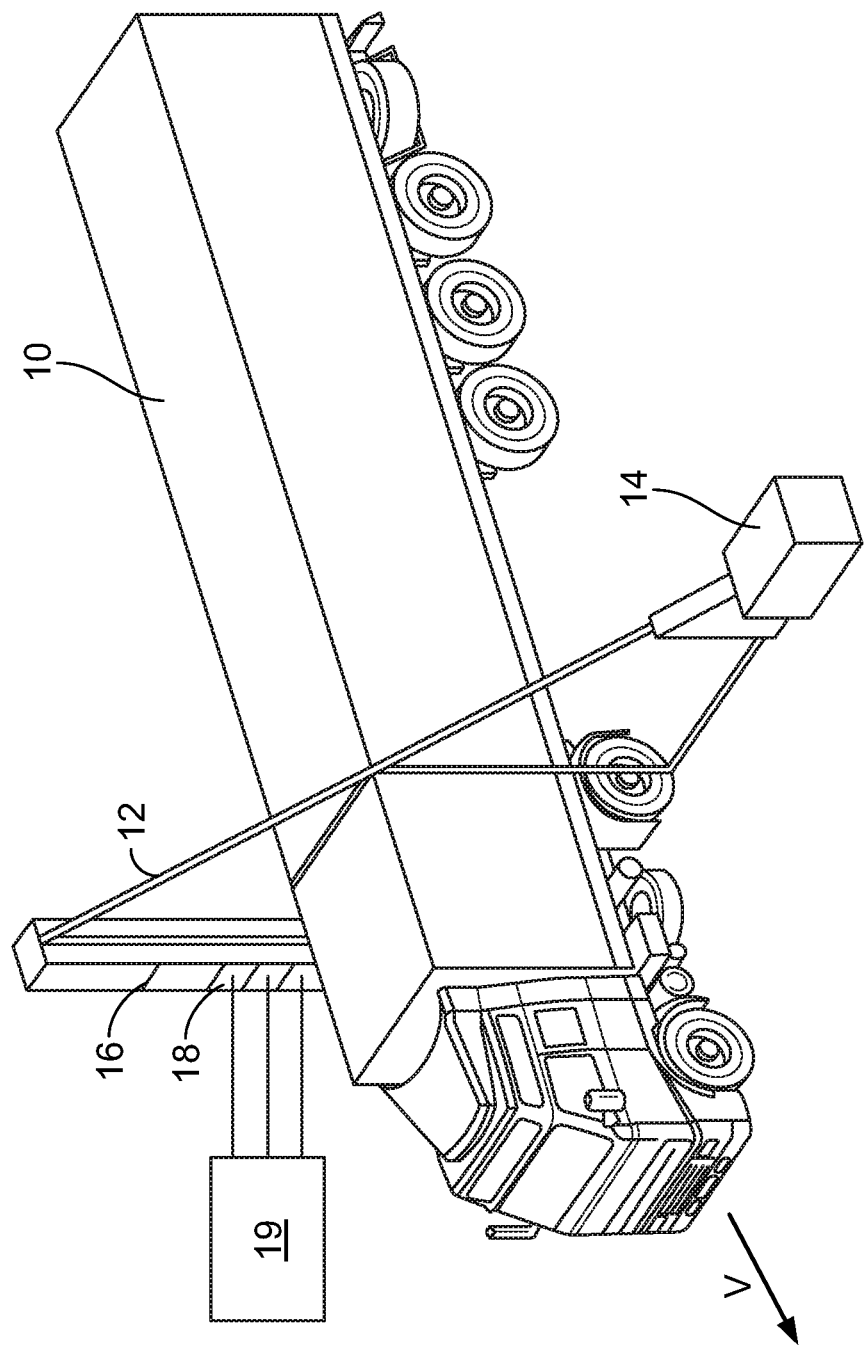
FIG. 1 illustrates a typical high-energy transmission X-ray inspection system, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Definitions

The term "multiple-energy" shall refer to an X-ray inspection modality in which differential transmission through a medium by X-rays of distinct spectral composition is used to characterize the medium.

The term "pulse duration," denoted $t_{RF}$, refers to the duration of time that RF excitation is applied to a linac accelerating structure.

The term "breaking point" of a current pulse of duration $t_L+t_H$, is defined to be the value of $t_L/t_H$, where $t_L$ and $t_H$ refer, respectively, to durations of the current pulse during which an electron beam emitted from an accelerating structure is characterized by low- and high-energies, respectively.

In the case of a current pulse having multiple sub-pulses, any pair of sub-pulses may be characterized by a breaking point that is defined as the value of $t_L/t_H$, where $t_L$ and $t_H$ refer, respectively, to durations of current sub-pulses.

A breaking point of a set of current pulses or sub-pulses shall be said to be "dynamically variable" if the breaking point is adapted to be varied from one pair of current pulses or sub-pulses to another pair of current pulses or sub-pulses. Similarly, an end point of a pulse may also be characterized as "dynamically variable" if the end point is adapted to be varied from one current pulse to another current pulse.

The term "current level," as it pertains to an x-ray source, refers to an average flux of electrons incident upon the target, expressed in milliAmperes (mA), and averaged over a specified duration of time. Unless otherwise indicated, the specified duration over which an average is taken is the duration of a pulse.

The term "current amplitude," as it pertains to an x-ray source, refers to a value of an instantaneous flux of electrons incident upon the target, expressed in mA.

The term "onset delay" refers to a period between application of an RF field to an accelerating structure and injection of a pulse or sub-pulse of electron current into the accelerating structure. Where there are multiple sub-pulses of electron current, then the cumulative onset delays of the respective sub-pulses make up a sum of onset delays.

As used herein, the term "Bremsstrahlung" may be used to denote X-ray emission produced through impingement of high-energy electrons onto a metallic target, and, additionally, the physical process involved in that phenomenology.

The term "steady state", in general, refers to a period of substantially constant or unvarying condition, such as, for a given wave or signal, preceding or subsequent values, over a predefined period, that are within ±n % of each other. A steady state condition often follows a period of substantially changing or varying condition, such as, for a given wave or signal, preceding or subsequent values, within a predefined period, that are in excess of ±n % of each other. The n value depends on specifics of applications and can typically vary from 10% or more to 1% or less.

There are two substantially different processes relevant to this invention to which the term "steady state" is applicable. The first process—exponential approach to "steady state" value—is described by separately first or separately second term of equation (10). Mathematically, it takes an infinite time to reach steady state value. Technically, it takes $t\approx 2.3$ $\tau$ to reach 90% or $t\approx 4.6$ $\tau$ to reach 99% of the steady state value. The second process is described by equation (10) as a whole. Two exponential processes (first term and second term of equation (10)) characterized by the same timing constant $\tau$ but different amplitude with opposite sign. There is unique time $t_{b0}$ when resulting sum of two exponents become time-independent and, mathematically, reaches "steady state" value described by equation (11) precisely at time $t_{b0}$. Technically, the transient time from exponential process to the steady state value (on leading edge of the current pulse) and back to exponential (on the rear edge of the current pulse) is reached within the time comparable with the lead/rear edge of the actual current pulse. More details on controlling necessary precision of time $t_{b0}$ is described further in a subsequent section "Controlling Beam Energy Stability".

The focus of this study is on the timing processes of interaction of accelerating field in the resonant structure with accelerating beam. The signals noise, reflections in linac RF-network and/or measuring lines are not under detailed consideration. Corresponding remarks are made when actual waveforms from operational linac are under discussion.

The systems and methods described herein may be described in terms of X-rays, however the applicability of the teachings to other spectral ranges is clear, and encompasses, within the scope of the invention, all manner of penetrating radiation.

Various embodiments of the invention described herein employ variation of the spectral content of an X-ray pulse during the course of the pulse to discriminate differences in X-ray transmission of a medium in different energy regimes. Approaches taught in accordance with the present invention are particularly advantageous in cases where high speed of scanning is required, such as train or high-throughput scanners.

In accordance with embodiments of the present invention, a novel apparatus and novel methods are provided that may advantageously create a pulse profile of a multi-energy beam in such a manner that would improve material discrimination while preserving the highest possible scanning speed and allow optimizing dose to cargo and environment. Additionally, embodiments of the present specification provide methods of fine adjustment of optimal delay for low and high energy pulses for single energy, interlaced or intra-pulse operation.

A novel source of penetrating radiation, designated generally by numeral 20, in accordance with an embodiment of the present invention, is now described with reference to FIG. 2. A linac 21, depicted in FIG. 2, includes accelerating structure 22, and an electron gun 23 serving as an injector of electrons emitted by cathode 235. Used in conjunction with linac 21 are an X-ray target 24, an RF-source 25, an RF-source modulator 26, an RF isolator 27 and an electron gun modulator 28. An RF-circuit 29, comprising RF-source 25 and RF-source modulator 26, provides a constant level of microwave power 250 within pulse duration $t_{RF}$. Electron gun 23, driven by e-gun modulator 28, provides an accelerated electron beam 220 characterized by a two-level injection current pulse 210 (also referred to herein as "the pulse") into accelerating structure 22 with a total duration $t_p \leq t_{RF}$. Injection current pulse 210 may also be referred to herein as "injection current," and its amplitude, which, as defined above, corresponds to its instantaneous value of electron flux in mA, denoted $I_L$ and $I_H$.

The first portion 212 of the pulse 210, characterized by a higher amplitude of the injection current $I_L$, due to higher beam loading creates a low energy portion of the beam pulse, where the low energy portion is designated by $W_L$. (For avoidance of ambiguity, it is to be noted that $W_L$ refers both to the low energy portion of the pulse, and to the value of the instantaneous endpoint energy characterizing the low energy portion of the pulse. The same applies, mutatis mutandis, to $W_H$, the high energy portion of the pulse.) The second portion 214 of the injection current pulse with lower amplitude $I_H$ produces a high energy portion of the beam pulse $W_H$. The "breaking point" of the pulse, which, as defined above, has the specialized meaning of the value of $t_L/t_H$, may be variable, within the scope of the present invention, thereby enabling dynamic control of the dose of emitted X-rays to cargo and environment. In accordance with certain embodiments of the present invention, the breaking point may advantageously be varied from pulse to pulse, rendering it a dynamically variable breaking point.

Figure 3:
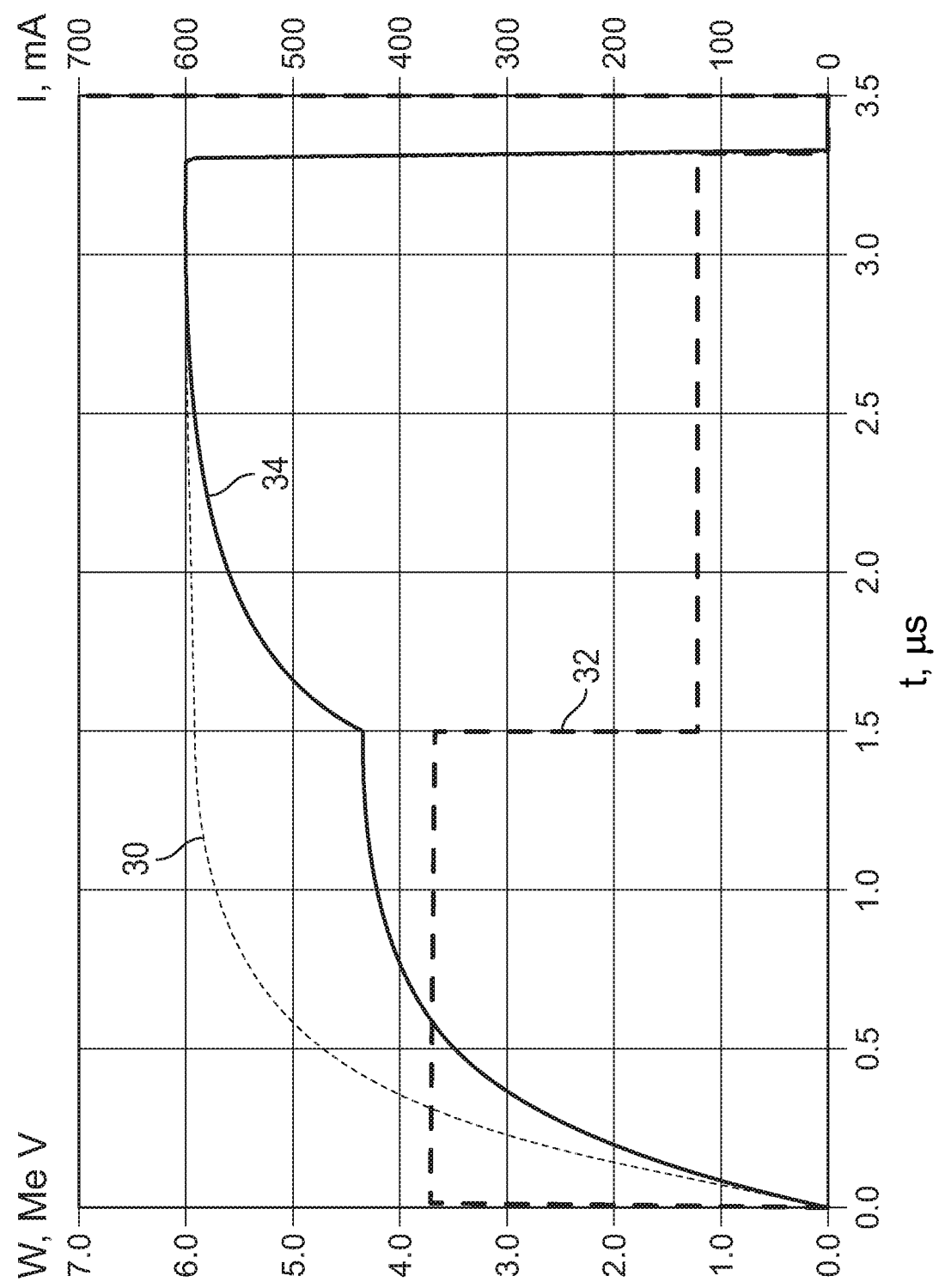
FIG. 3 illustrates dependence of energy and current within a microwave pulse, in accordance with some embodiments of the present specification.

Reference is made now to FIG. 3, where dependence of energy and current within a microwave pulse is depicted. Dashed line 32 shows the accelerated beam current, while solid line 34 represents the beam energy. Dotted line 30 shows energy dependence at constant current $I_H$, as previously discussed. As a result of different beam loading effect in the front and rear portion of the pulse, the beam has two distinct energy levels, and, in one embodiment: $W_{L(0.-1.5)\mu s}$=3.9 MeV and $W_{H(1.8-3.3)\mu s}$=5.8 MeV. As used herein, "energy level" refers to an average per sub-pulse duration electron beam energy. An appropriate reference to the end-point energy of an ensemble of photons, distributed in energy according to an essentially Bremsstrahlung spectrum of photon energies can be made based on the electron beam energy spectrum.

Optimizing coupling coefficient $\beta_0$ of the accelerating structure for the parameters of the single energy beam is known in the art and has been described in the Background Section above. In practice, the accelerating structure 22 is over-coupled (coupling coefficient $\beta_c$>1, also $\beta_c \geq \beta_0$) for all values of accelerating current (I) and RF-power (P) considered for operation.

Figure 2:
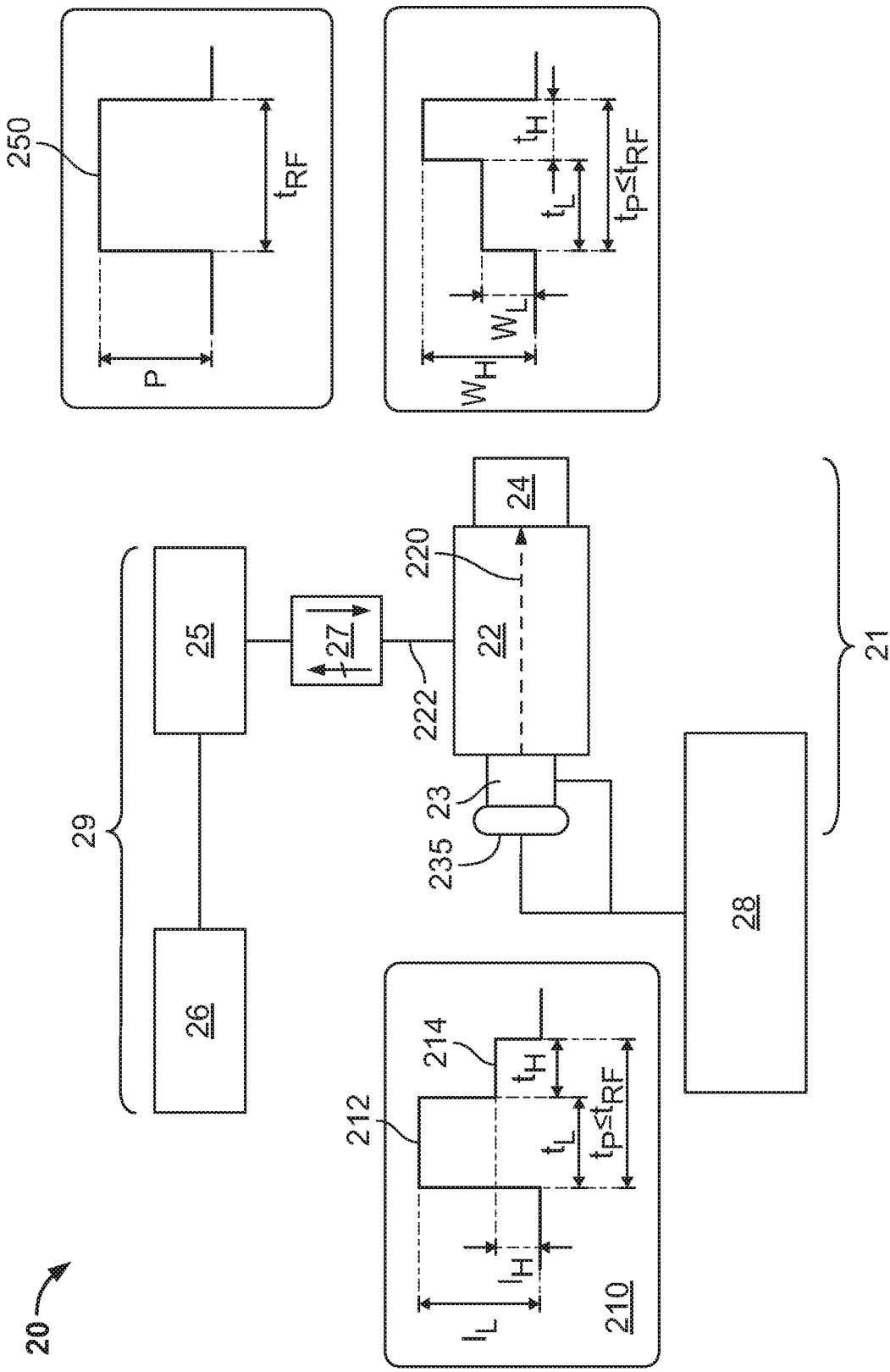
FIG. 2 illustrates a block diagram of an X-ray source employing an accelerating structure and modulated within a microwave pulse injection current and RF excitation, in accordance with some embodiments of the present specification.
Figure 4:
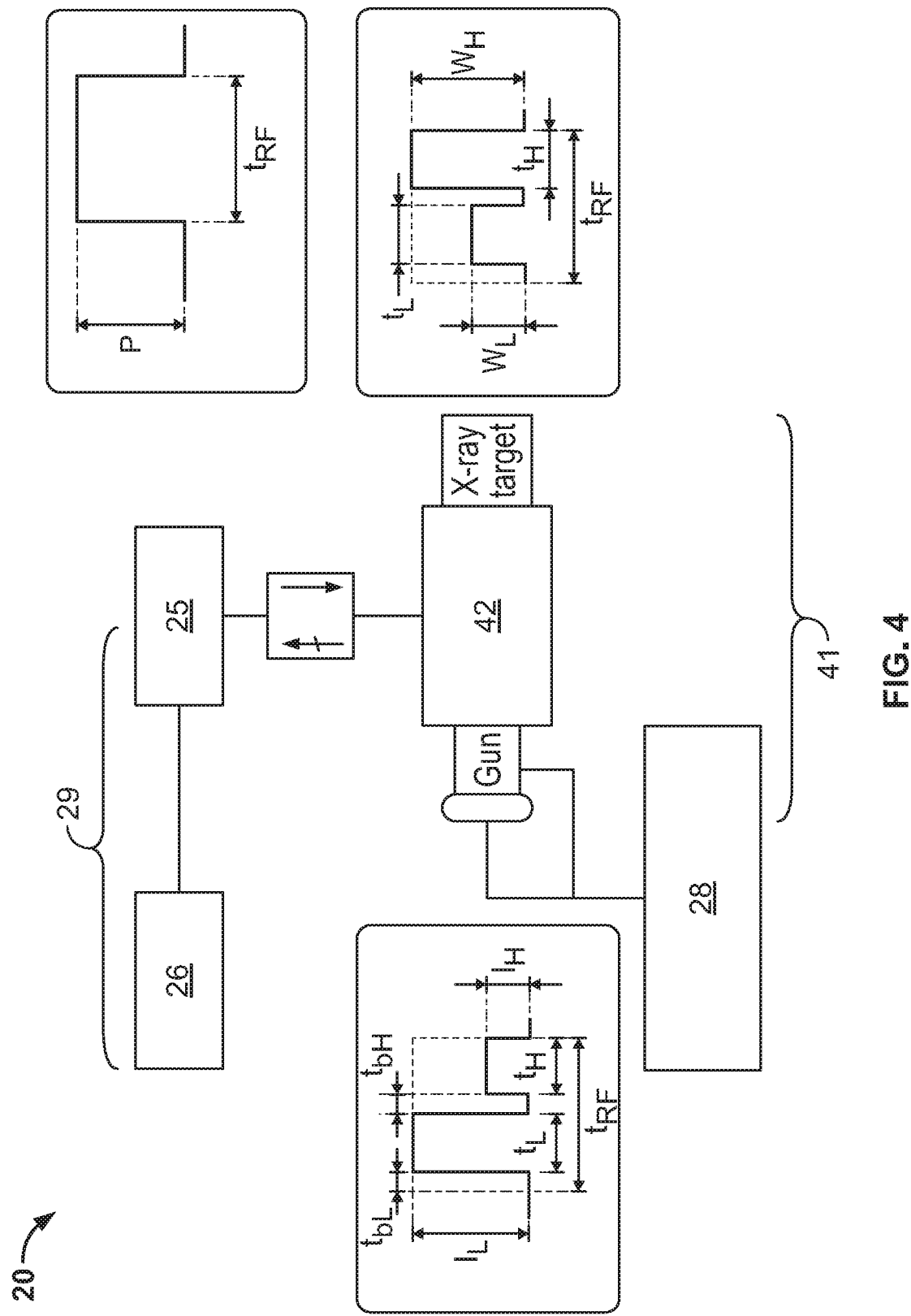
FIG. 4 illustrates a block diagram of an X-ray source employing a standing wave accelerating structure with modulated within a microwave pulse injection current and RF excitation, in accordance with some embodiments of the present specification.

In FIG. 4, a linac 41 is shown that is similar to the linac 21 shown in FIG. 2. The accelerating system 20 is based on a standing wave structure 42 (otherwise referred to herein as a "standing wave resonator"), the distinction of which with respect to a traveling wave structure has been laid out by Miller (1986). The coupling coefficient $\beta_0$ is chosen to be optimal at the current $I_L$, using the algorithm that was laid out in detail above. The value of $I_L$ is chosen to provide energy $W_L$, and this energy value $W_L$ remains constant over an entire sub-pulse duration if $I_L$ is applied with delay $t_{bL}$ with respect to the beginning of the RF pulse. Low energy current delay $t_{bL}$ is defined by equation (4) above. At the end of the low energy pulse (after $t_L$), the current turns off. The value of $I_H$ is chosen to provide $W_H$, and this energy level remains constant if $I_H$ current is applied with delay $t_{bH}$ counting from the end of low energy pulse $t_L$. The high energy pulse delay is defined by equation:

$$t_{bH} = \tau \cdot \ln\left(\frac{I_L}{I_H}\right) \quad (6)$$

In accordance with certain embodiments of the present invention, the $t_L$ point may be allowed to vary, thereby allowing the ratio $t_L/t_H$ (defined herein as the "breaking point") to be varied, and thus advantageously providing for dynamic control of the X-ray dose to cargo and environment.

The average current during the lower energy portion of the pulse will be referred to herein as the low energy current, and, mutatis mutandis, the average current during the higher energy portion of the pulse will be referred to herein as the high energy current.

The energies within each portion of the pulse will remain constant as long as the "low energy" current begins to be applied after a delay of $t_{bL}$, and as long as the "high energy" current is applied with a delay of $t_{bH}$. The constancy of energy within each of the low energy and high energy portions of the pulse is beneficial for material discrimination: the energy spectrum of X-ray beam remains constant hence no additional calibration point(s) is required.

Figure 5:
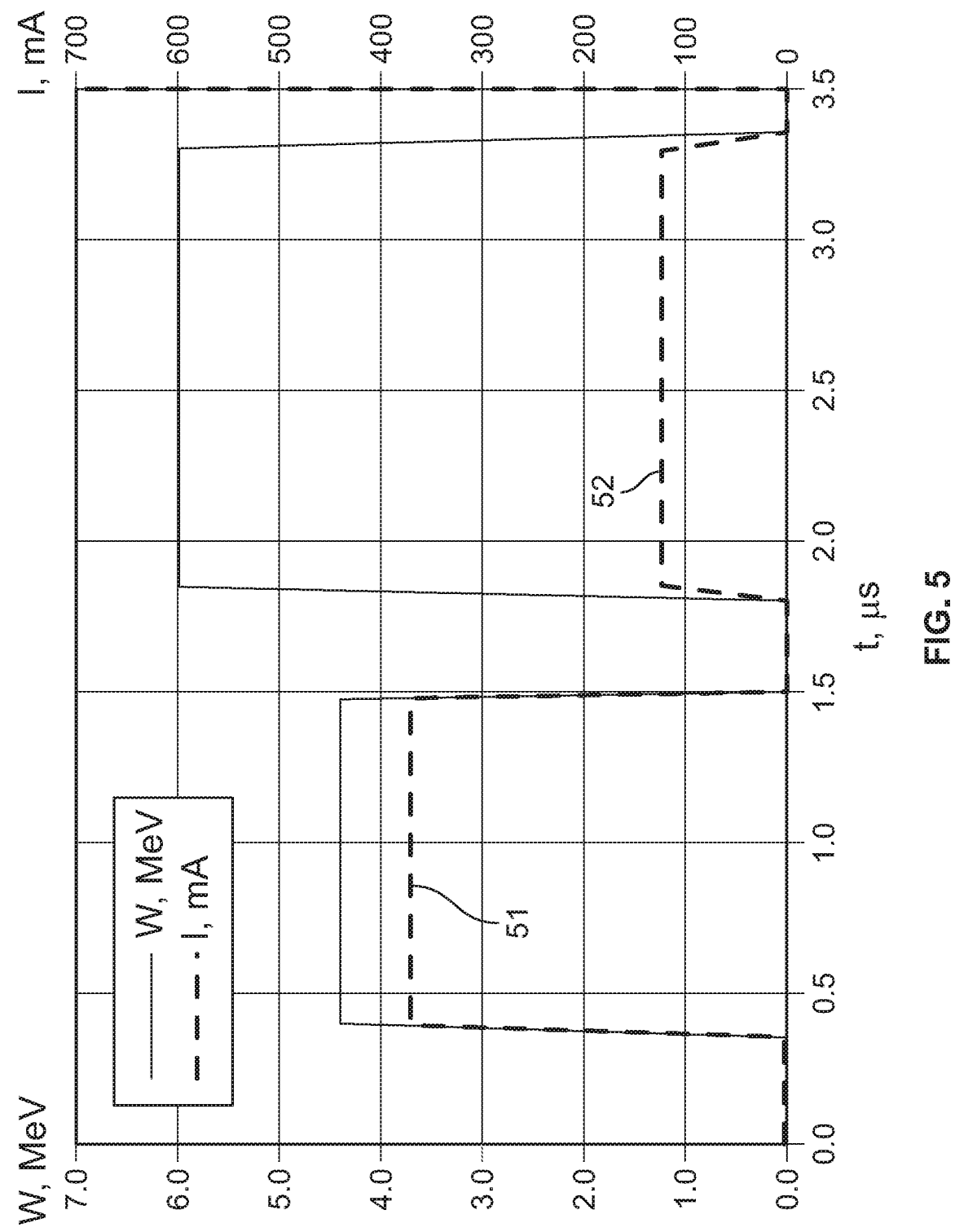
FIG. 5 illustrates a linac implementation with a dual-energy pulse created by applying the $I_L$ and $I_H$ currents with optimal delays, in accordance with an embodiment of the present specification.

An example of linac implementation with a dual-energy pulse that is created by applying the $I_L$ and $I_H$ currents with optimal delays is shown in FIG. 5. Parameters of the linac are identical to those that have been shown as an example in FIG. 3. Low energy current 51 is applied at an optimal delay of $t_{bL} \cong 0.34$ µs and is turned off after $t_L \cong 1.45$ µs. High energy current 52 is applied with delay of $t_{bH} \cong 0.36$ µs at t≅1.8 µs and is turned off at the end of microwave pulse.

In practice, parameters such as $\beta c$, r, L, $P_H$, $P_L$, $I_H$, $I_L$, for calculating an optimal delay, are not known with enough accuracy to guarantee necessary constant value of the beam energy for both low and high energy level. Adjustments to optimal delay values are required if energy spectrum changes while dynamically changing pulse duration of the beam. The adjustments can be performed based on parameters that are typically available for monitoring for most of accelerators. Such adjustments can be performed based on assessment of parameters that are typically used for monitoring particle accelerators and beams performance. Such parameters (variables) for example are: instant value of electron beam energy, average energy per pulse (sub-pulse), instant value of the RF-Power reflected from the accelerating cavity with single or multiple current pulses injected, and X-ray beam intensity integrated over the pulse or sub-pulse duration. Linear electron accelerator for applied applications (for example, security, Non-Destructive Testing (NDT), medical treatment) typically do not have sophisticated equipment for direct monitoring of beam energy, energy spectrum of the beam, or even electron beam output. In such cases, adjustments to optimal delay values may be performed based on an analysis of reflected power waveform and consequently iteratively adjusting injection delay ($t_{bL}$ and $t_{bH}$). The exemplary embodiments of adjusting the injection delay are described further in a subsequent section. Information pertaining waveform of the power reflected from accelerating structure is commonly available for most RF accelerators. Additionally, an analysis of normalized intensity dependence vs. pulse duration may be performed followed by fine re-adjusting of the injection delay. X-ray beam intensity measurements are also typically available for linacs with X-ray output.

Figure 6:
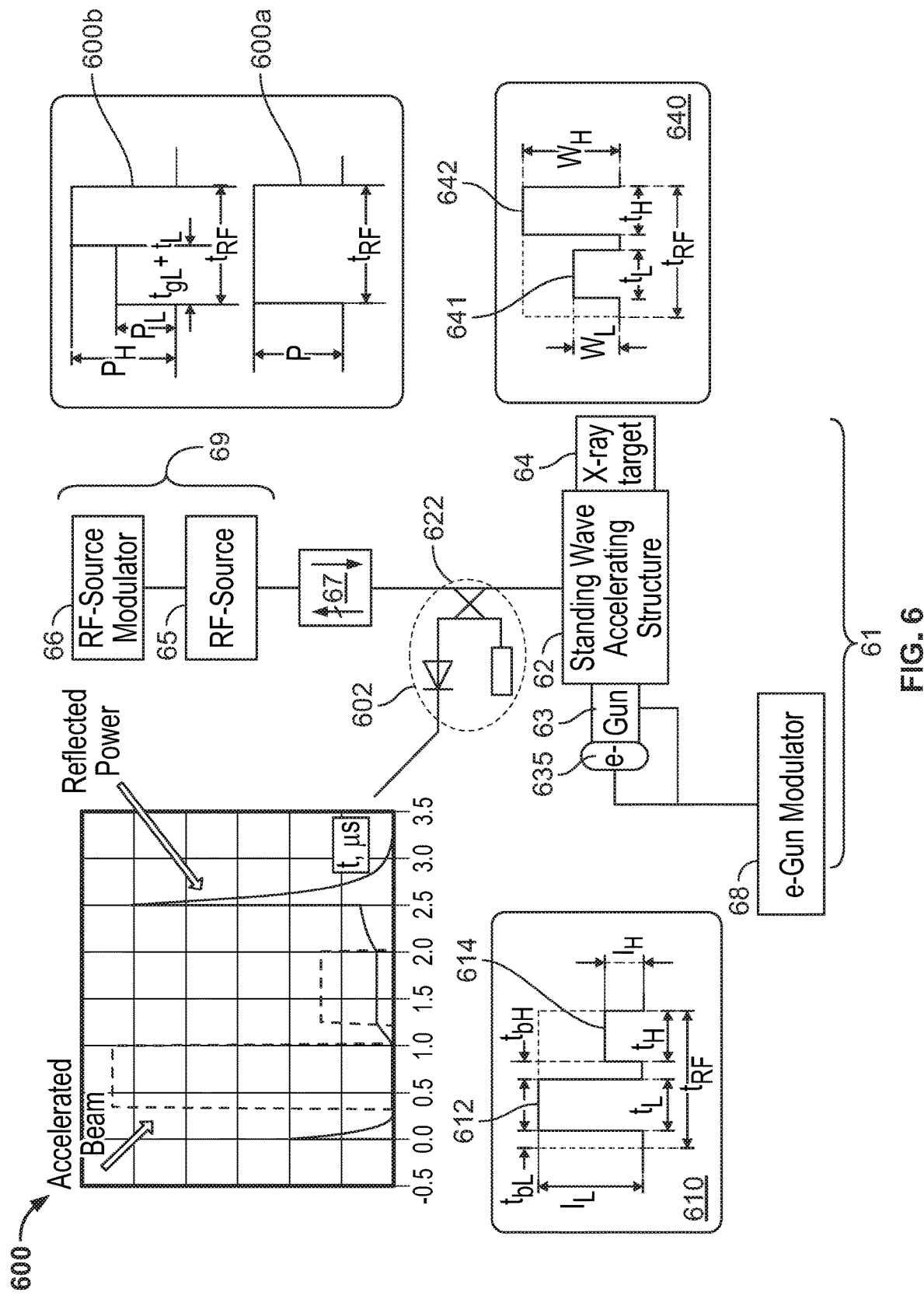
FIG. 6 illustrates a block diagram of an X-ray source employing an accelerating structure and modulated within a microwave pulse injection current and RF excitation, in accordance with some embodiments of the present specification.

In another improvement, the injection of electron beam pulses is timed, by applying predefined delays, in order to achieve a first sub-pulse, at a first beam current amplitude, and a second sub-pulse, at a second beam current amplitude, that are different and have minimized deviations relative to predefined steady state energy levels. Referring to FIG. 6, a system that determines the required pulse delays and achieves the optimized injection of electron beam pulses is shown, comprising an exemplary linac system 600 with intra-pulse operation and a directional coupler 602 for extracting reflected power waveform.

A linac 61, includes a standing wave accelerating structure 62, and an electron gun 63 serving as an injector of electrons emitted by cathode 635. Further included are an X-ray target 64, an RF-source 65, an RF-source modulator 66, and an RF isolator 67. The standing wave accelerating structure 62 is connected to the RF-source 65 with feeding waveguide 622 and characterized by coupling coefficient $\beta_c$ which is chosen to provide over-coupling conditions ($\beta_c$>1) of the accelerating structure in presence of the accelerating current with highest amplitude $I_{max}$. Further linac includes an electron gun modulator 68. In embodiments of the present specification, electron gun modulator 68 may also be referred to herein as a gun-controller 68 as it controls the injection of electron beam current. An RF-circuit 69, comprising RF source modulator 66 and RF source 65, provides either a constant level of microwave power (P) 600a within pulse duration $t_{RF}$ or two-level (multi-level) microwave power function ($P_L$, $P_H$) 600b for enhancing the energy difference between low-energy 614 and high-energy 642 sub-pulses. The RF-circuit 69 may also be referred to herein as an RF-controller 69 as it controls the structure of microwave power feeding into accelerating structure 62. Electron gun 63, driven by e-gun modulator 68, provides an electron beam characterized by a two-level injection current pulse 610 (also referred to herein as "the pulse") into accelerating system 62 with a total duration $t_p \leq t_{RF}$. Injection current pulse 610 may also be referred to herein as "injection current", and its amplitude, which, as defined above, corresponds to its instantaneous value of electron flux in mA, denoted $I_L$ and $I_H$.

A first portion 612 of the pulse 610, characterized by a higher amplitude of the injection current $I_L$, that due to higher beam loading creates a low-energy portion 641 of the beam pulse 640, where the low-energy portion is designated by $W_L$. (For avoidance of ambiguity, it is to be noted that $W_L$ refers both to the low energy portion of the pulse, and to the value of the instantaneous endpoint energy characterizing the low energy portion of the pulse. The same applies, mutatis mutandis, to $W_H$, the high-energy portion of the pulse.) A second portion 614 of the injection current pulse with lower amplitude $I_H$ produces a high energy portion 642 of the beam pulse $W_H$. Sub-pulses duration $t_L$ and $t_H$ may respectively refer to the duration of $I_L$ and $I_H$, and subsequently $W_L$ and $W_H$.

In various embodiments, the RF-circuit 69 provides a two-level pulse of microwave power 600b within pulse duration $t_{RF}$, characterized by low-energy microwave power level $P_L$ and time duration of this level at least $t_{bL}+t_L$, and high-energy microwave power level $P_H$ with remaining time duration of RF-pulse $t_{RF}$. Electron gun modulator 68 provides electron beam characterized by a two-level injection current pulse with a total duration $t_p \leq t_{RF}$. The first pulse is characterized by a higher amplitude of the injection current $I_L$. Due to higher beam loading and lower microwave power a low energy portion of the beam pulse is created, where the low energy portion is designated by $W_L$; The following second portion of the injection current pulse with lower amplitude $I_H$ in combination with higher microwave power produces a high energy portion of the beam pulse $W_H$. In another embodiment the high energy pulse $W_H$ can be created first by placing high energy microwave power level $P_H$ and appropriate injection current $I_H$ at the beginning of the microwave pulse following low energy pulse $W_L$ that is created with appropriate microwave power level $P_L$ and injection current $I_L$. Therefore, in embodiments, the electron gun modulator 68 and RF-circuit 69 are configured to produce X-ray energy levels either in a descending or an ascending order.

In embodiments, RF-controller provides microwave power pulse of constant amplitude 600a, gun controller provides descending order of injection current 610 with amplitudes $I_H < I_L < I_{max}$. Gun-controller also generates low-energy sub-pulse optimal delay $t_{bL}$ and high-energy sub-pulse optimal delay $t_{bH}$ in order to maintain constant amplitude of beam energy correspondently within low-energy sub-pulse 641 and high-energy sub-pulse 642. The optimal delays $t_{bL}$ and $t_{bH}$ for this case are defined by equations (7), $$\begin{cases} t_{bL} = \tau \cdot \ln\left(\dfrac{\sqrt{4\beta_c rLP}}{I_L rL}\right) \\ t_{bH} = \tau \cdot \ln\left(\dfrac{I_L}{I_H}\right) \end{cases} \quad (7)$$

In embodiments, RF-controller provides microwave power pulse with two distinct power level with amplitudes $P_L < P_H$ in ascending order 600b where low-energy sub-pulse $P_L$ has duration $t_{bL}+t_L$, gun controller provides descending order of injection current 610 with amplitudes $I_H < I_L < I_{max}$. Gun-controller also generates low-energy sub-pulse optimal delay $t_{bL}$ and high-energy sub-pulse optimal delay $t_{bH\_a}$ in order to maintain constant amplitude of beam energy correspondently within low-energy sub-pulse 641 and high-energy sub-pulse 642. The optimal delays $t_{bL}$ and $t_{bH}$ for this case are defined by equations (8), $$\begin{cases} t_{bL} = \tau \cdot \ln\left(\dfrac{\sqrt{4\beta_c rLP_L}}{I_L rL}\right) \\ t_{bH\_a} = \tau \cdot \left[\ln\left(\dfrac{I_L}{I_H}\right) + \ln\left(1 + \dfrac{\sqrt{4\beta_c rLP_L}}{I_L rL}\sqrt{\dfrac{P_H}{P_L} - 1}\right)\right] \end{cases} \quad (8)$$

Sometimes it is beneficial forming dual-energy pulse 640 with descending order of sub-pulses 641 and 642 with corresponding amplitudes $W_H$ and $W_L$. In embodiments, RF-controller provides microwave power pulse with two distinct power levels with amplitudes $P_H > P_L$ in descending order where high-energy sub-pulse $P_H$ has duration $t_{bH}+t_H$, gun controller provides ascending order of injection current 610 with amplitudes $I_H < I_L < I_{max}$. Gun-controller also generates first high-energy sub-pulse optimal delay $t_{bH}$ and second low-energy sub-pulse optimal delay $t_{bL\_d}$ in order to maintain constant amplitude of beam energy correspondently within low-energy and high-energy sub-pulses. The optimal delays $t_{bH}$ and $t_{bL}$ for this case are defined by equations (9), $$\begin{cases} t_{bH} = \tau \cdot \ln\left(\dfrac{\sqrt{4\beta_c rLP_H}}{I_H rL}\right) \\ t_{bL\_d} = \tau \cdot \left[\ln\left(\dfrac{I_L}{I_H}\right) + \ln\left(1 + \dfrac{\sqrt{4\beta_c rLP_H}}{I_H rL}\sqrt{1 - \dfrac{P_L}{P_H}}\right)\right] \end{cases} \quad (9)$$

According to the embodiments of the present specification, after each appropriate delay, $t_{bL}$, $t_{bL\_d}$ and $t_{bH}$, $t_{bH\_a}$, electron gun modulator 68, further tunes the appropriate delay on the basis of an amount of power reflected from accelerating structure 62. In embodiments, a directional coupler and microwave detector 602 are configured to determine an amount of power reflected from accelerating structure 62. In some embodiments, detector 602 operates in a region closed to a square low resulting in the signal proportional to the microwave power.

In embodiments, the objective to tune each delay is to maintain the amplitude of power reflected from accelerating structure 62 during accelerating beam current pulses $I_L$ and/or $I_H$ within predefined deviation ranges of steady state values of reflected power correspondently for low and high energy pulse (or sub-pulse). Further, electron gun modulator 68 modifies the tuned delays ($t_{bL}$, $t_{bL\_d}$ and $t_{bH}$, $t_{bH\_a}$) based on determining a timing required to maintain a normalized X-ray beam intensity of low energy pulses and/or high energy pulses in a corresponding predefined range, wherein the normalized X-ray beam intensity is a function of the X-ray beam intensity produced by low energy pulses and/or high energy pulses relative to the corresponding pulse width ($t_L$ or $t_H$). A subsequent section titled "Controlling Beam Energy Stability" gives more details on setting and maintaining constant value of reflected power and X-ray beam intensity as well as the values of predefined ranges of parameters.

Subsequent sections of the present specification, including FIGS. 7-12, provide specific details on using the reflected power and X-ray beam intensity data as the tools for setting and maintaining constant value of accelerated beam energy within pulses/sub-pulses of different energy levels.

In an interlaced, an intra-pulse or a single-energy operation, fine tuning of an injection point of a single high or low energy pulse may be achieved by first assessing an optimal delay for the high and low energy components assuming single beam pulse structure. This may be followed by analyzing the reflected power waveform shape and adjusting injection time for achieving acceptable level of beam energy deviation within injected beam pulse. This step may be performed for each energy component as a single energy beam pulse structure or an intra-pulse dual-energy structure. Finally, normalized X-ray beam intensity distribution may be collected and analyzed. Fine adjustments to the injection time may be made accordingly.

Figure 7:
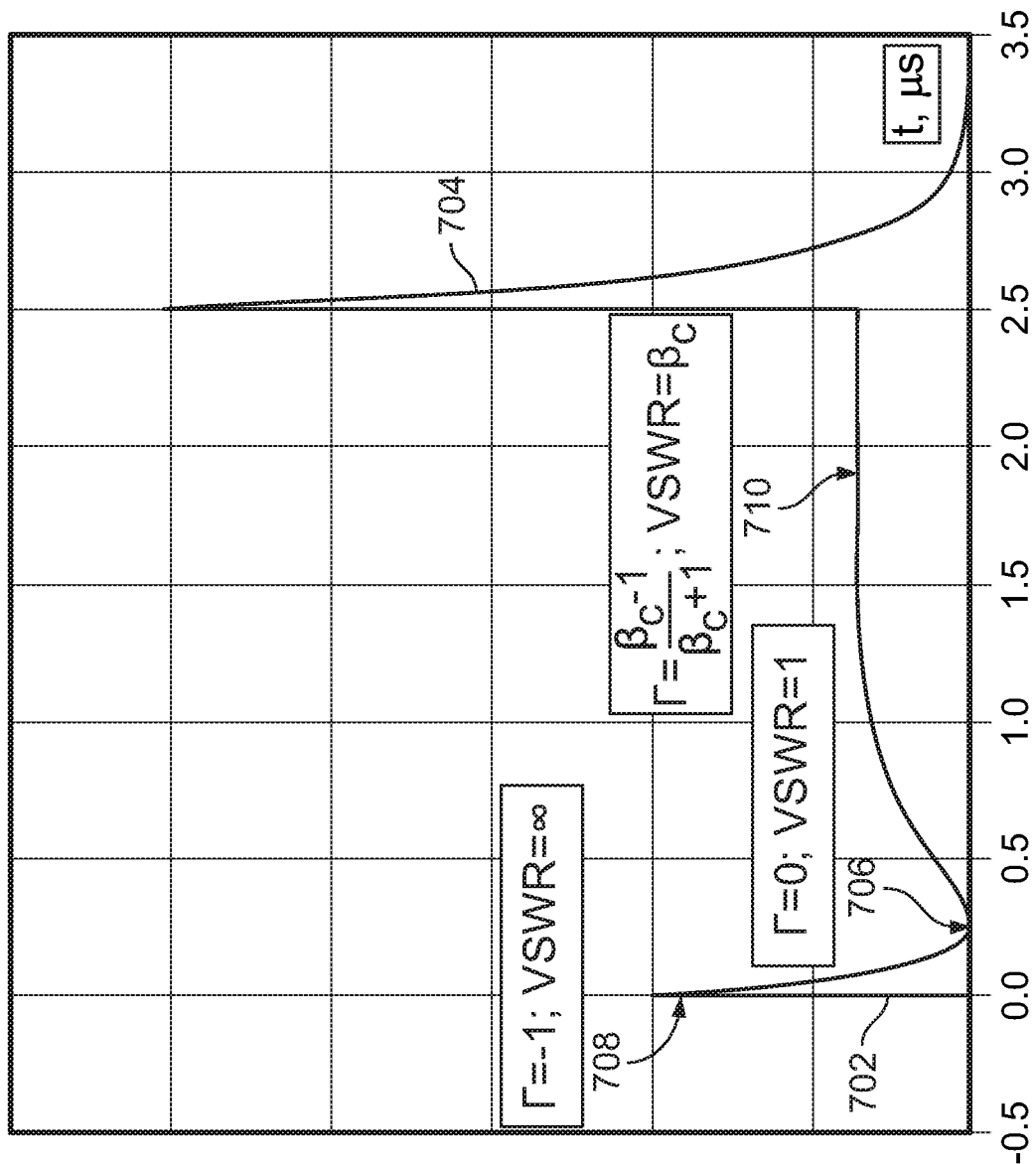
FIG. 7 illustrates waveform of reflected power from over-coupled microwave cavity and no accelerated beam current present, which may be detected by a detector, in accordance with some embodiments of the present specification.

FIG. 7 illustrates reflected power 704 from microwave cavity with no accelerated beam present, which may be detected by detector 602, in accordance with some embodiments of the present specification. In embodiments, detector 602 operates in the region close to a square low resulting in a signal proportional to the microwave power. In embodiments, the coupling coefficient is greater than one for any considered combination of microwave power P and accelerated current I, which means that the accelerating structure 62 is over-coupled for any considered mode of operation (low energy or high energy pulses). In embodiments, a numerical value of the reflected power is represented by reflection coefficient ($\Gamma$) and Voltage Standing Wave Ratio (VSWR). VSWR for over-coupled cavity is also equal to the coupling coefficient $\beta_c$ and may be calculated from the reflected power waveform.

At the first moment 708 of applying pulse of RF-power 702 (t=0), the resonator acts as a short circuit ($\Gamma$=−1) and full RF-power is reflected from the microwave cavity. As the field builds up in the cavity with exponential low, the VSWR transitions through a matching point 706, where $\Gamma$=0, VSWR=1, and then approaches steady-state value 710 with VSWR=$\beta_c$, $\Gamma$=($\beta_c$−1)/($\beta_c$+1). Accelerating current injected in the waveguide provides "additional matching" effectively reducing VSWR of accelerating cavity with current. At the optimal value of accelerating current $I_{opt}$, VSWR=1. The highest value of accelerating waveguide efficiency is reached at these parameters. In this case, the field in the cavity will remain constant over the beam duration time ($t_{opt}$) if the beam is injected exactly at the point 706 {$\Gamma$=0, VSWR=1} on the reflected waveform in FIG. 7. In a generic case, $I_L<I_{opt}$, the first, low energy pulse ($I_L$) for ascending order of energy levels or high-energy pulse ($I_H$) for descending order of energy levels, needs to be injected (and therefore timed or delayed) to the right of the point 706 {$\Gamma$=0, VSWR=1}. The reflected signal will remain constant during first beam pulse duration time ($t_L$ or $t_H$) if delay is equal to the optimal delay defined by first equation in appropriate system of equations (7), (8) or (9).

The high-energy accelerating current $I_H$ for ascending order of energy levels or low-energy pulse ($I_L$) for descending order of energy levels may then be injected at the time of corresponding optimal delay $t_{bH}/t_{bH\_d}/t_{bL\_d}$ for the reflected signal to also remain constant during this beam pulse duration time ($t_H$ or $t_L$) at pulse-specific value of VSWR.

Figure 8:
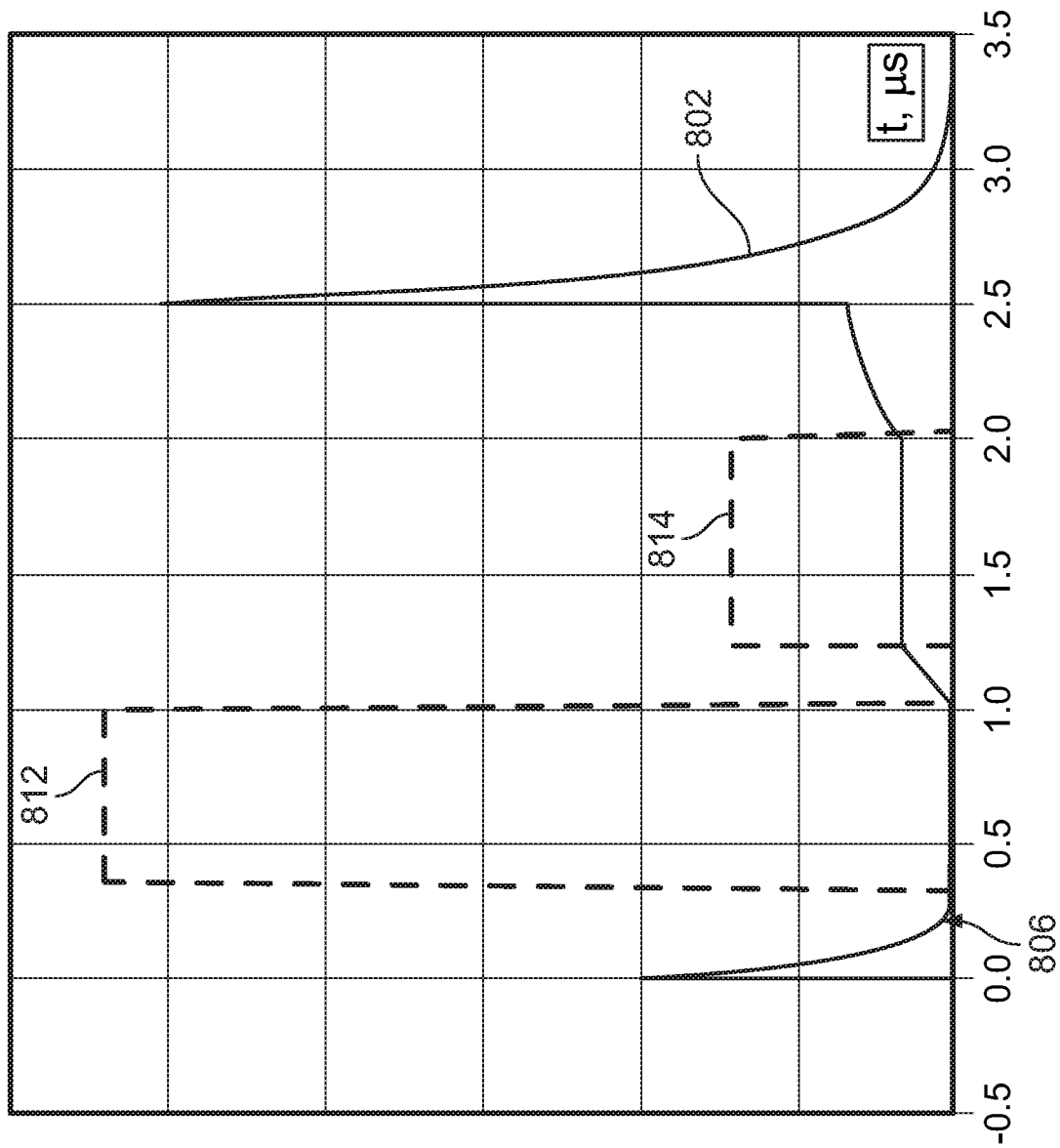
FIG. 8 is a graph illustrating a reflected power waveform obtained with a low energy and a high energy injection currents consecutively injected to form a dual energy beam, in accordance with some embodiments of the present specification.

FIG. 8 is a graph illustrating a simulated reflected power waveform 802 obtained with a low energy ($I_L$) 812 and a high energy ($I_H$) 814 accelerated currents consecutively injected at optimum delays to form an intra-pulse dual-energy beam, in accordance with some embodiments of the present specification.

In this case, the field in the cavity remains constant over the beam duration time ($t_L$). On the reflected waveform the low energy pulse is injected (and therefore timed or delayed) slightly to the right of point 806, where $\Gamma$=0, VSWR=1, so that the reflected signal remains constant during beam duration time ($t_L$) at the "low-energy" VSWR amplitude. The high-energy accelerating current $I_H<I_L$, to be accelerated in the waveguide, is injected at the time of optimal delay $t_{bH}$ so that the reflected signal also remains constant during this beam duration time ($t_H$) at the higher value of "high-energy" VSWR amplitude.

It is critical for material discrimination with dynamic dose control to maintain a smallest possible energy deviation from a steady state energy level while pulse duration changes to vary the dose. To a significant degree, the energy stability depends on accuracy of setting and maintaining the optimal injection time.

It should be also noted that a "classical" reflected power waveform, such as the ones illustrated in FIGS. 7 and 8, could be achieved with high restrictions on parameters such as but not limited to: RF-pulse shape such that it is perfectly square, presence of noise, and losses in the RF-line, among others. Typically, such a "classical" reflected power waveform can be achieved at low RF-power signals with "sharp" leading and rear fronts.

Figure 9:
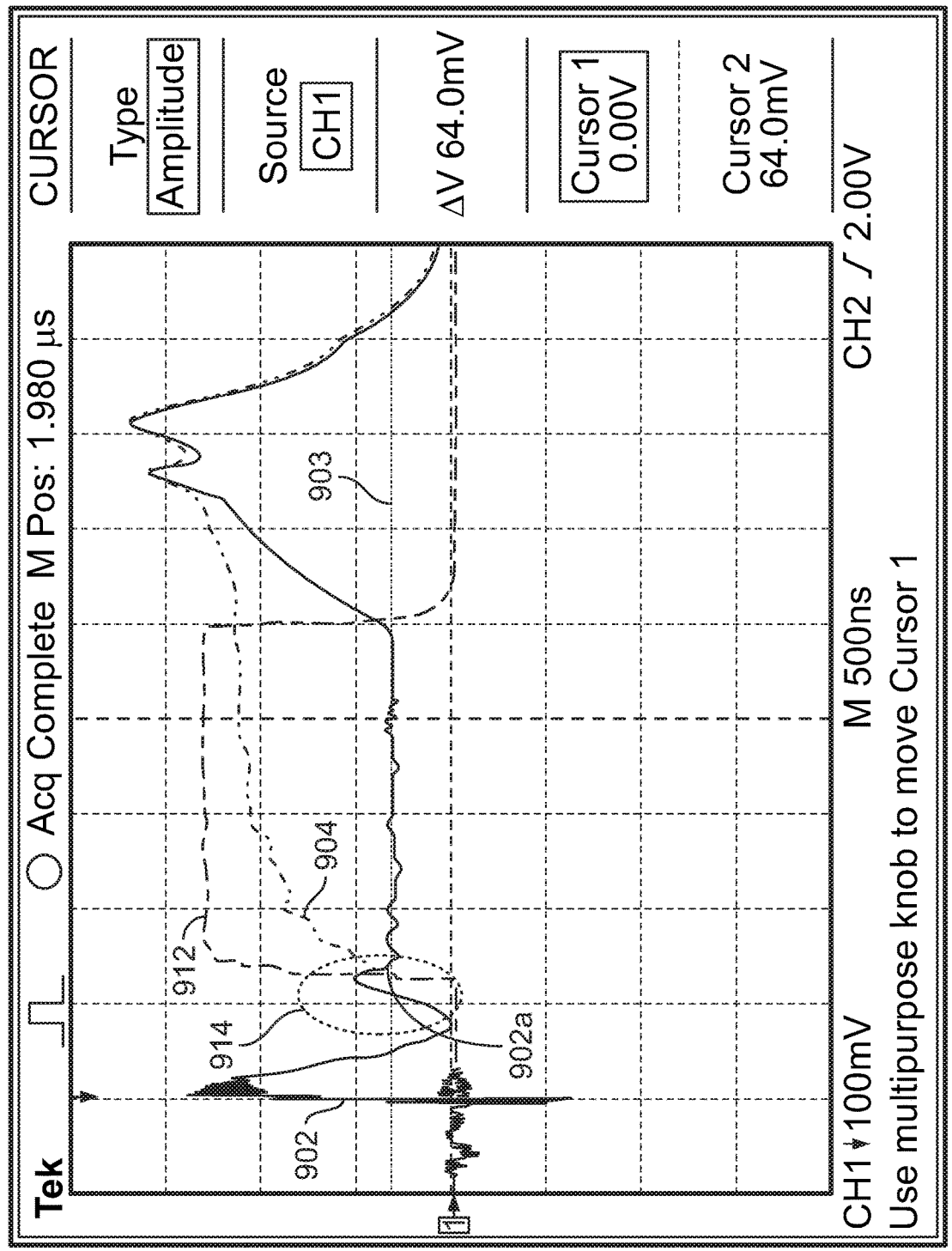
FIG. 9 is a graph illustrating an exemplary reflected power waveforms obtained from an industrial linac when a beam current injection pulse is injected at an optimal time.
Figure 10:
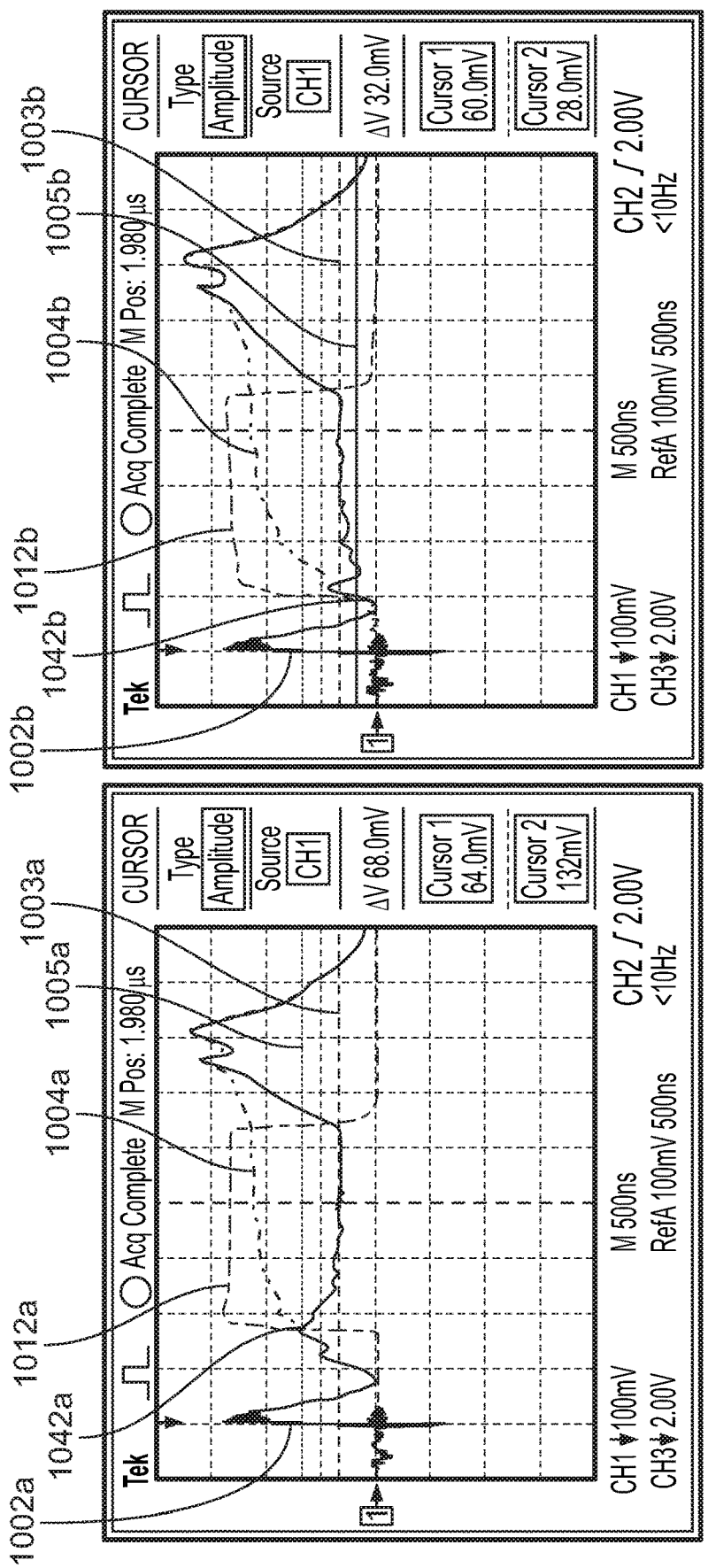
FIG. 10A is a graph illustrating an exemplary reflected power waveform when a beam current injection pulse is injected later than an optimal time (over-shoot)
FIG. 10B is another graph illustrating an exemplary reflected power waveform when a beam current injection pulse is injected earlier than an optimal time (under-shoot)

FIG. 9 is a graph illustrating reflected power waveforms corresponding to a beam current pulse 912 obtained from an industrial linac. Reflected power waveform 902, shown in yellow line, corresponds to beam current pulse 912, shown in red line, which is injected at a time close to an optimal time delay, as described above. Another reflected power waveform 904 ("unloaded"), shown in grey, corresponds to the same RF-pulse but for a scenario when there is no accelerated beam current pulse. Reflected power waveforms 902 and 904 coincide until the beam current pulse 912 is applied. Within the beam pulse duration reflected power waveform 902 deviates from "unloaded" waveform 904 and demonstrates constant amplitude level. A reference line 903 on the waveform is shown to demonstrate a steady state value of the reflected power signal (for specific accelerating beam and the accelerating structure parameters P, I, L, r, $\beta_c$) and the signal deviation from the steady state level 903. Both reflected power waveforms 902 and 904 are contaminated with some reflections and noise most visible at the leading edge of the beam current pulse 912. The area depicting the contamination is enclosed within a dotted circle 914. Reflected power waveforms 902 and 904 are also skewed by long rear front of the magnetron pulse. The portion of waveform 902 within the beam current pulse duration ("loaded" waveform) has technically achievable minimal deviation from reflected power steady state level 903. The "loaded" portion of reflected power waveform (starting with an initial point 902a where "loaded" waveform starts to deviate from "unloaded") has constant amplitude that equals the steady state value 903. Therefore, such a procedure of moving beam pulse within reflected power waveform (between the point {T=0, VSWR=1} and the end of the RF-pulse) to achieve constant level of "loaded" reflected power 902 amplitude (that will be equal to steady state value 903) may be used for achieving constant amplitude of beam energy within the beam pulse even without calculating the values of optimum time delays.

It should be also noted that most of the fluctuations around steady state level that are present on waveform 904, are consequences of linac technical imperfections rather than incorrect time delay setting. Tuning accelerating beam to achieve constant level 903 of reflected power 902 within an accelerated beam current pulse 912 also helps achieve more constant level of accelerated current itself. Reflected power level that mirrors linac accelerating field and the accelerated beam current amplitude are interdependent, especially in a buncher-type structure (that typically is the case for industrial linacs). Constant accelerating field results in constant injection beam capturing therefore a more uniform accelerated beam current amplitude is observed on the front portion of the beam current pulse in FIG. 9, and following FIGS. 10A and 10B.

FIGS. 10A and 10B illustrate two examples of an inaccurate beam injection time. FIG. 10A is a graph illustrating an exemplary reflected power waveform 1002a when an accelerated beam current pulse 1012a is injected later than an optimal time ("over-shoot"). Reflected power waveform 1002a associated with beam current pulse 1012a coincides with "unloaded" waveform 1004a until the beam pulse 1012a is applied. Subsequently, reflected power amplitude reduces, exponentially approaching a steady-state level 1003a that has the same value as in FIG. 9 and marked with the reference line 903. Within the beam pulse duration 1012a, amplitude of reflected power waveform 1002a is not constant: a leading portion of the waveform is above steady state value 1003a and an initial point 1042a of the "loaded" portion of waveform, exceeds the steady state value 1003a by at least two times. The amplitude of point 1042a is depicted with a reference line 1005a. In this scenario, the electron beam is accelerated by high electric field at the beginning of the current pulse 1012a and gains higher energy. The energy amplitude varies within the beam pulse 1012a duration. Energy spectrum as well as beam intensity spectrum varies with pulse duration of the beam (that is, intensity vs. pulse duration is not linear). Therefore, it may be deduced that current pulse 1012a needs to be moved to the left to the point where reflected power amplitude is equal to steady state value 1003a, thus achieving constant level of reflected power 1002a and, therefore, constant amplitude of beam energy within the beam pulse 1012a.

FIG. 10B is another graph illustrating an exemplary reflected power waveform 1002b when accelerated beam current pulse 1012b is injected earlier than an optimal time ("under-shoot"). In this example, a leading portion of the reflected waveform 1002b within the beam pulse is below steady state value 1003b. A value of leading portion 1042b of the "loaded" portion of waveform 1002b is at least two times less than steady state value 1003b. In this scenario, beam current pulse 1012b needs to be moved to the right toward the point where reflected power amplitude is equal to the steady state value thus achieving constant level of reflected power within the beam pulse and therefore a constant amplitude of beam energy.

In embodiments, the reflected power waveform may be continuously monitored and analyzed in order to determine the extent of adjustment to the injection time of beam current pulses. Additionally, with each analysis, the beam current pulse injection time may be adjusted to an optimal level needed to achieve a constant level of reflected power within each injected pulse, or to maintain the amount of power reflected from the accelerating structure within a predefined deviation range, such as outlined in subsequent section "Controlling Beam Energy Stability". The analysis and adjustment may be performed for each energy component both as a single energy beam pulse structure within an RF-pulse or dual (multi) energy beam structure within single RF-pulse (intra-pulse).

Consequently, normalized X-ray beam intensity distribution information may be collected and analyzed in order to make further finer adjustments to the beam current pulse injection time. The finer adjustment may be based on determining a timing required to maintain a normalized X-ray beam intensity in a predefined range, wherein the normalized X-ray beam intensity is a function of the X-ray beam intensity relative to the corresponding pulse width. For linac with X-ray output, the normalized X-ray beam intensity within a pulse can be used for such measurements. Intensity of X-ray beam (e.g. dose rate D) is a function of both beam energy and current. It may be assumed that the beam current is constant within the pulse width $t_p$, therefore measuring dependence of the normalized intensity $D/t_p$ vs. pulse width $t_p$ provides information on the energy stability when beam pulse duration changes.

Figure 11:
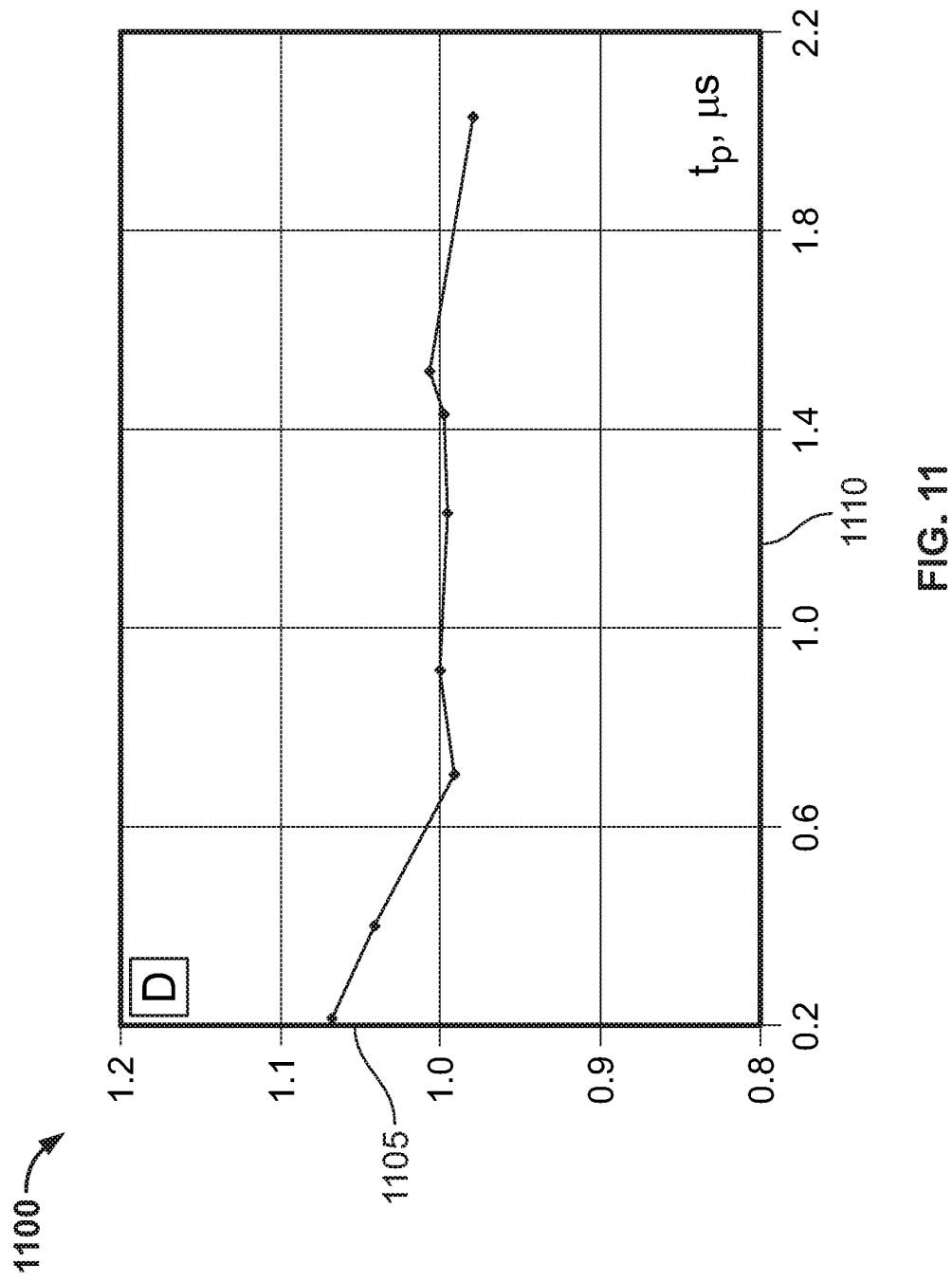
FIG. 11 is a graph illustrating an exemplary set of measurements of normalized on pulse width X-ray beam intensity (D) on y-axis and pulse width duration ($t_p$) on x-axis.

FIG. 11 is a graph 1100 illustrating an exemplary set of measurements of normalized on pulse width X-ray beam intensity (D) 1105 on y-axis and pulse width ($t_p$) 1110 on x-axis. The data were collected for a single energy beam, where a starting point of the beam pulse was maintain constant. Beam intensity was normalized on the pulse duration and then on the average value of all data points. As seen in the graph, the normalized on the pulse width X-ray beam intensity (D) is higher (up to ≈7%) for the lower pulse durations ($t_p$), implying that the energy amplitude of the accelerated beam is higher at the beginning of the pulse (as in example of FIG. 10A). The beam injection time may need to be reduced (pulse shifted to the left) if magnitude of deviation is outside of an acceptable range that may be defined using methods outlined in a subsequent section in the present specification relating to "Controlling Beam Energy Stability".

Figures 12A, 12B:
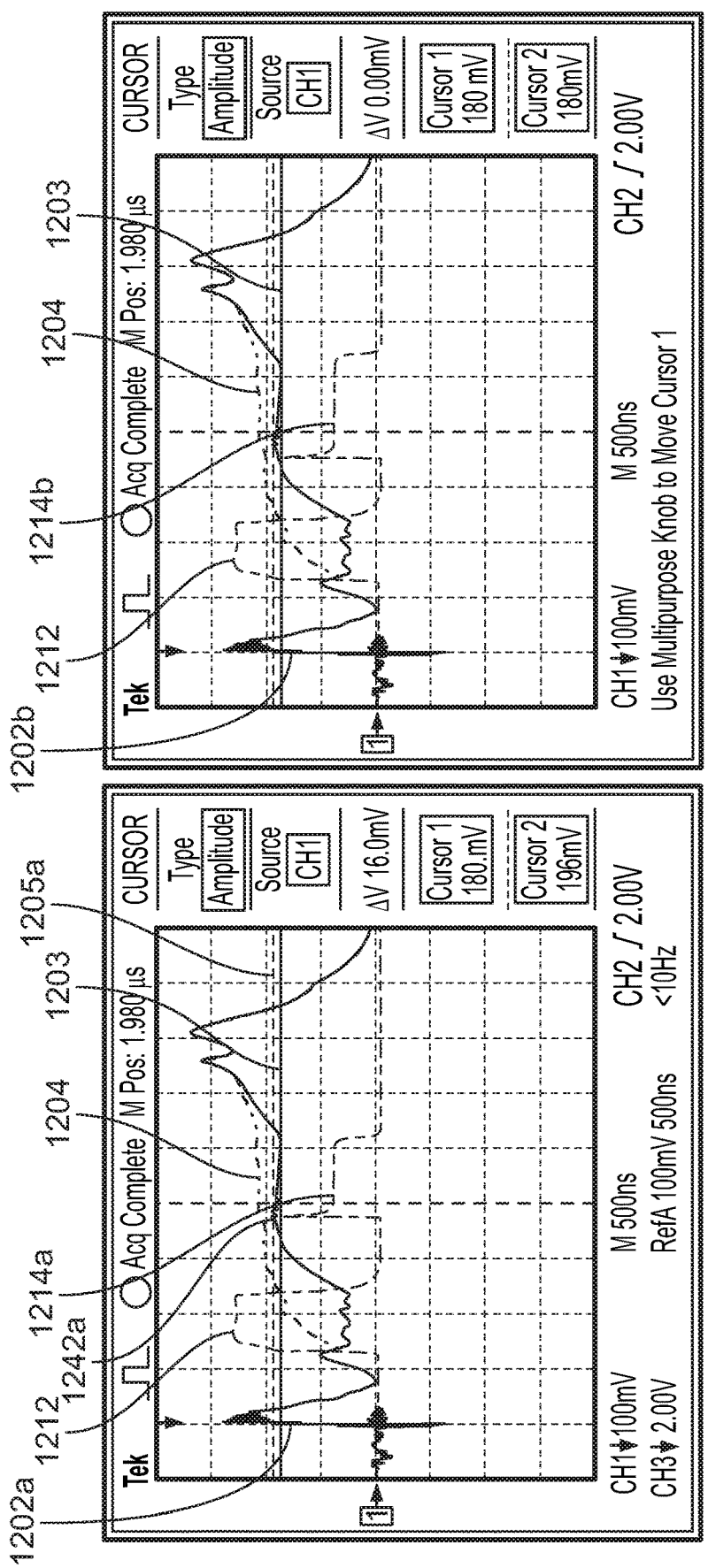
FIG. 12A illustrates an exemplary waveform for an intra-pulse dual energy structure, when a second (high energy) beam pulse is injected later than an optimal time (high-energy over-shoot) in accordance with some embodiments of the present specification.
FIG. 12B illustrates an exemplary waveform for an intra-pulse dual energy structure, when a second (high energy) beam pulse is injected at an optimal time in accordance with some embodiments of the present specification.

FIGS. 12A and 12B illustrate exemplary graphs for an intra-pulse dual energy structure, in accordance with some embodiments of the present specification. Referring to FIGS. 12A and 12B simultaneously, "loaded" reflected power waveforms 1202a and 1202b are shown that correspond to a low energy beam current pulse 1212 and high energy beam current pulses 1214a and 1214b, respectively. Low energy beam current pulse 1212 may be placed at an injection time found during a preliminary adjustment stated above for a single energy beam pulse structure in context of FIG. 9. "Unloaded" reflected waveforms 1204 are also shown. Loaded reflected power waveforms 1202a and 1202b demonstrate constant level of reflected power during the low energy beam current pulse 1212 with an amplitude that equals to a reflected power steady state value for low energy pulse. Referring to FIG. 12A, the high energy beam current 1214a is placed with higher than optimum injection delay. "Loaded" reflected waveform 1202a exceeds high energy reflected power steady state level 1203, at the beginning 1242a of the high energy beam pulse. The highest amplitude of reflected power within high energy beam pulse is depicted with a line 1205a and exceeds steady state level by approximately 10%. Referring to FIG. 12B, injection time of high energy beam pulse has been reduced by ≈0.2 μs (pulse moved to the left) and the level of the reflected power waveform 1202b remains constant and equals to high energy steady state value during the high energy beam pulse 1214b as per the various embodiments of the present specification.

In embodiments, normalized X-ray beam intensity distribution vs. sub-pulse duration for high energy component, may be collected and analyzed. Necessary adjustment to injection time may be made accordingly. As an option, total intensity of the dual energy pulse can be measured while the low energy pulse time is fixed and equal to the value of one of the pulse durations taken in the course of preliminary low energy tuning. Using data collected for several high energy sub-pulse durations, the intensity of the high energy sub-pulse component may be calculated as a difference of the total intensity and the known intensity of a low energy sub-pulse and then normalized using the high energy sub-pulse duration.

Figure 13:
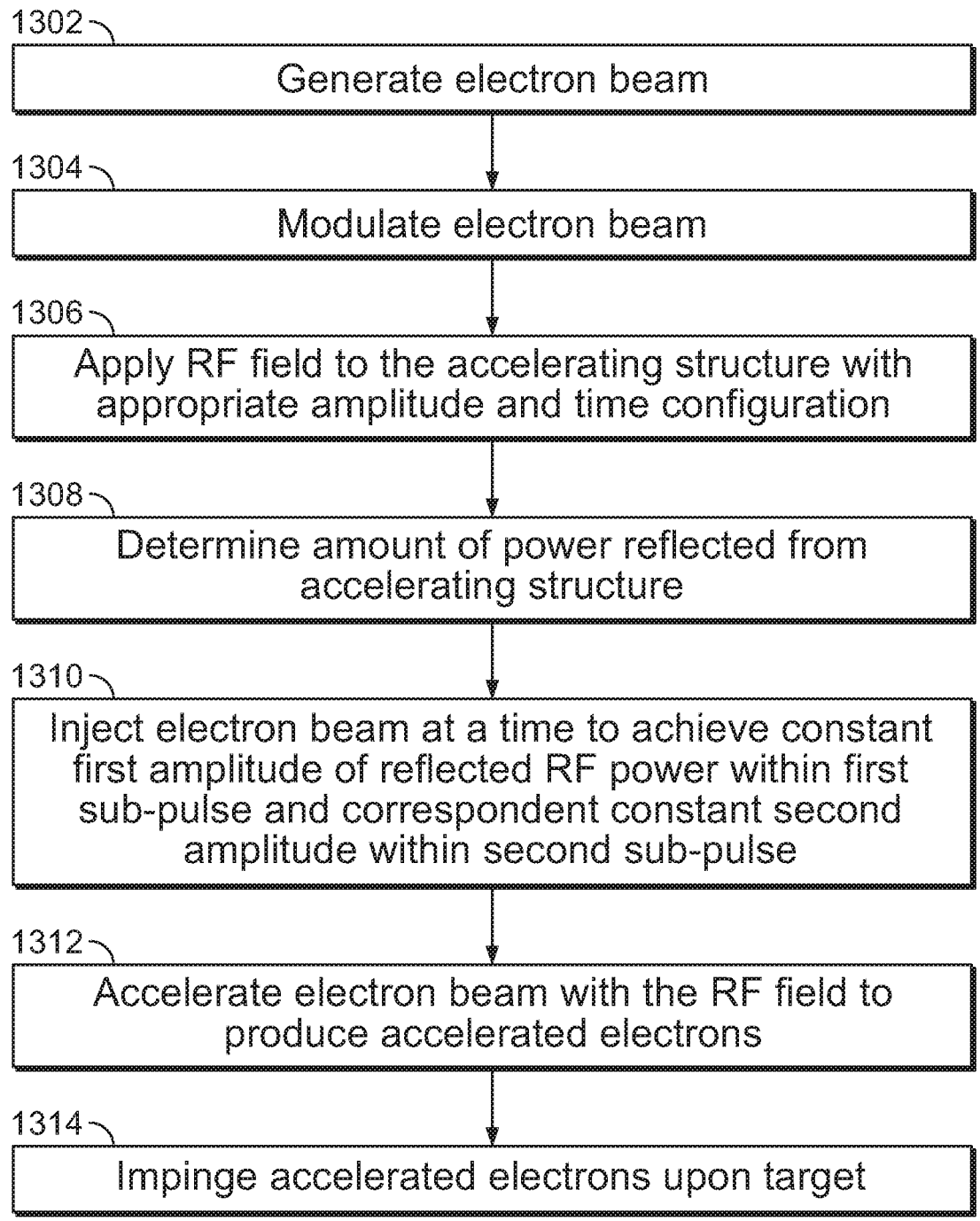
FIG. 13 is an exemplary flow chart illustrating a method of intra-pulse tuning, in accordance with some embodiments of the present specification.

FIG. 13 is an exemplary flow chart illustrating a method of intra-pulse tuning, in accordance with some embodiments of the present specification. Referring simultaneously to FIGS. 6 and 13, at 1302, electron gun 63, controlled by modulator 68, generates a beam of electrons within standing wave accelerating structure 62. Electron gun 63 controlled by electron gun modulator 68 is configured, at 1304, to modulate the beam of electrons prior to injection into accelerating structure 62 to achieve at least a first beam current amplitude ($I_L$) and a first beam current temporal profile of duration $t_L$ and injected at a first delay of $t_{bL}$, and a second beam current amplitude ($I_H$) and a second beam current temporal profile of duration $t_H$ and injected after a second delay of $t_{bH}$. For purposes of description, it is assumed here that a descending sequence of beam current pulses is injected into accelerating structure 62 in order to generate an ascending sequence of energy beams correspondently $W_L$ and $W_H$. In alternative embodiments, a reverse sequence may be adopted. Herein, the first beam current amplitude ($I_H$) is injected to form a high energy beam pulse $W_H$, followed by a second beam current amplitude ($I_L$) to form a low energy beam pulse $W_L$.

At 1306, RF source 65 applies a radio frequency field with an RF power amplitude (P) and an RF power temporal profile characterized by an RF pulse duration ($t_{RF}$) to accelerating structure 62. For purposes of description, it is assumed here that RF power remain constant within single RF-pulse. In alternative embodiments, an ascending or descending sequence of power levels ($P_H$, $P_L$) with appropriate timing structure may be adopted.

The beam of electrons is accelerated within accelerating structure 62 with the RF field to produce accelerated electrons toward target 64 for generating X-rays. At 1308, an amount of RF-power reflected from the accelerating structure 62 is determined with the aid of directional coupler and microwave detector 602.

At 1310, electron gun 63 controlled by electron gun modulator 68, injects the beam of electrons at the first beam current amplitude ($I_L$) after first time delay and then at the second beam current amplitude ($I_H$) after a second time delay. The time delay for each beam current pulse may be determined using the equations (7), (8) or (9). The time delays are determined so as to maintain an energy deviation from a correspondent steady state energy level of less than a predefined amount, as described above. Additionally, the time delays are determined such that the amount of RF-power reflected from the accelerating structure 62 during each beam sub-pulse is maintained within a predefined deviation range of correspondent steady state reflected power levels.

Further, the time delay is adjusted to ensure that a normalized X-ray beam intensity lies within a predefined range, wherein the normalized X-ray beam intensity is a function of the X-ray beam intensity relative to the corresponding beam pulse width ($t_L$ or $t_H$).

At 1312, the beam of electrons is accelerated with the RF field within accelerating structure 62 to produce accelerated beam with dual-energy structure within a single RF-pulse. At 1314, the accelerated electrons impinge upon target 64 for generating X-rays by Bremsstrahlung.

In embodiments, energy amplitudes within each portion of an RF-pulse will remain constant as long as a "low energy" current begins to be applied after a delay of $t_{bL}$, and as long as a "high energy" current is applied with a delay of $t_{bH}$. The constancy of energy within each of the low energy and high energy portions of the pulse is beneficial for material discrimination while duration of sub-pulses $t_L$ and/or $t_H$ are varied. Furthermore, the energy spectrum of X-ray beam remains constant within each pulse hence no additional calibration point(s) is required.

Controlling Beam Energy Stability

Minimizing beam energy variation for each energy level is crucial in using dual/multi-energy method of material discrimination, in accordance with the embodiments of the present specification.

Energy dependence of the accelerated beam from time is giving by the equation:

$$W = \frac{\sqrt{4\beta rLP}}{1+\beta}\left(1 - \exp\left(-\frac{t}{\tau}\right)\right) - \frac{IrL}{1+\beta}\left(1 - \exp\left(-\frac{t - (t_{b0} + \delta)}{\tau}\right)\right) \quad (10)$$

Where,
W is electron beam energy;
P is RF pulse power, necessary to provide acceleration energy level;
I is accelerated beam current;
R is effective shunt impedance;
L is accelerating system length;
$\beta$, $\beta_0$ are coupling, and optimal coupling coefficients of RF-cavity;
t, $t_p$ are time starting from beginning of RF pulse, and duration of the RF-pulse;
$t_b$, $t_{b0}$, $\delta$ are time, optimum time for accelerating current to be turned on (injected in accelerating system), and deviation from optimum time.
$\tau$ is the exponent defined as $$\tau = \frac{2Q_0}{\omega(1+\beta)}$$

In the equation (10) the beam injection occurs at time $t = t_{b0} + \delta$.

If $\delta = 0$, and $$t_b = t_{b0} = \tau \cdot \ln\left(\frac{\sqrt{4\beta rLP}}{IrL}\right),$$

which is called optimum injection time for the given set of parameters, then dependence energy from time is illuminated and equation (10) reduces to:

$$W_{SS} = \frac{\sqrt{4\beta rLP}}{1+\beta} - \frac{IrL}{1+\beta} \tag{11}$$

This is the steady state (SS) value of energy of the accelerated beam for the given set of beam parameters and standing wave cavity characteristics.

Normalized on $\sqrt{rLP}$, beam energy absolute deviation from steady state value, with assumption that beam injection time is not optimal, can be presented by equation:

$$\Delta W_n = W_n - W_{SSn} = -\frac{2\sqrt{\beta}}{1+\beta} \cdot \exp\left(-\frac{t}{\tau}\right) \cdot \left(1 - \exp\left(\frac{\delta}{\tau}\right)\right) \tag{12}$$

Beam energy relative deviation from steady state value can be calculated from the following equation:

$$\delta W_n = \frac{\Delta W_n}{W_n} = \frac{\exp\left(-\frac{t}{\tau}\right) \cdot \left(\exp\left(\frac{\delta}{\tau}\right) - 1\right)}{1 - \exp\left(-\frac{t_{b0}}{\tau}\right)} \tag{13}$$

Figure 14:
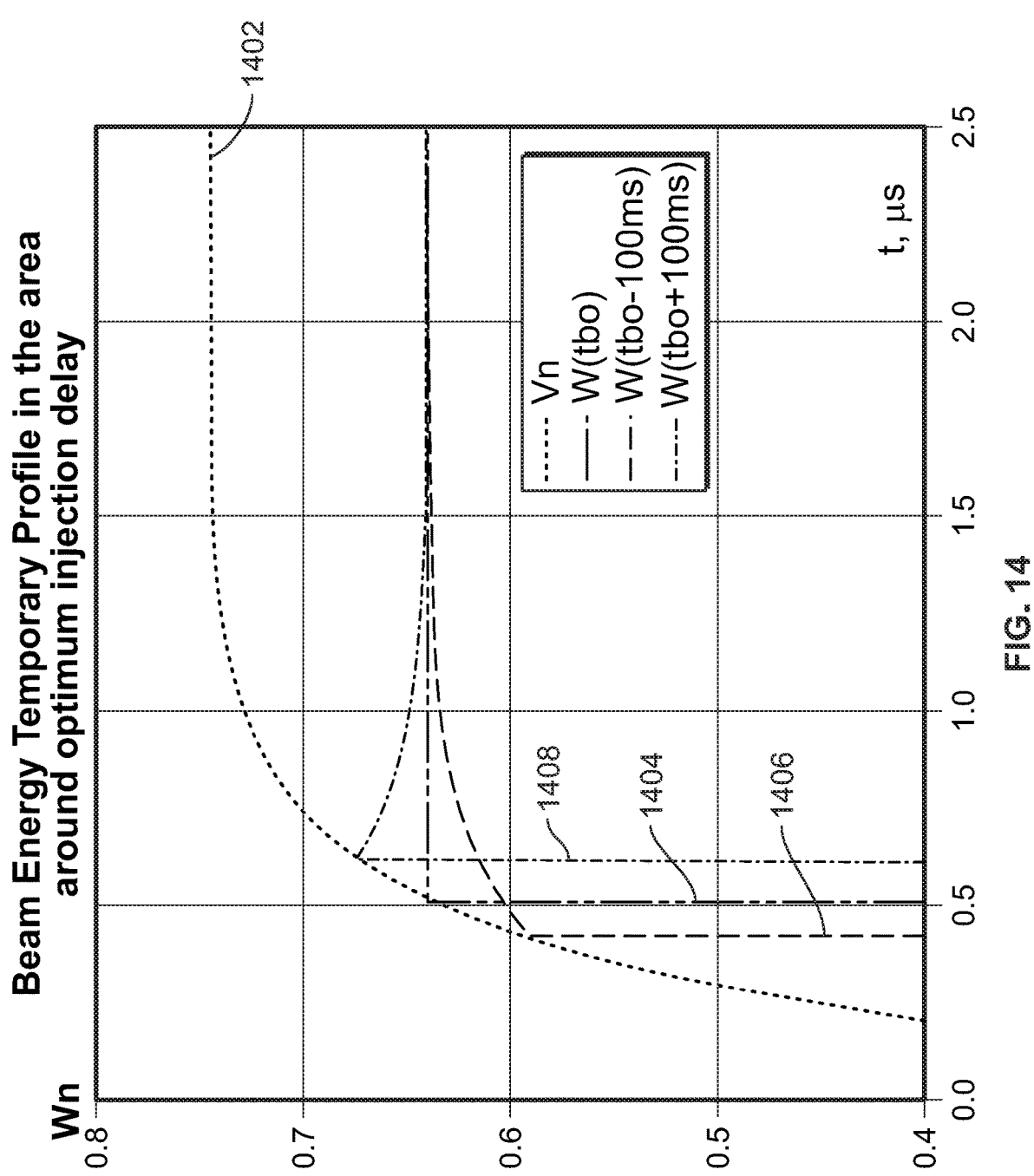
FIG. 14 is a graph illustrating a beam energy profile in an area around an optimum injection delay, in accordance with some embodiments of the present specification.

FIG. 14 is a graph illustrating a plot of energy dependence versus time (pulse duration) according to equation (10) for four cases. Referring to the graph, dotted line 1402 shows electrical field build-up without any current injected; green line 1404 shows energy of the beam injected at optimum time and constant level of beam energy with no dependence on time; red line 1406 shows the energy level for an early injection ("undershoot") of the beam pulse; and blue line 1408 shows energy level for a late injection ("overshoot") of the beam pulse. In the cases of an undershoot and an overshoot, referring to lines 1406 and 1408, the beam energy approaches SS value as an exponential function characterized by exponent r and amplitude of energy deviation from SS level at injection time $t=t_{b0}+\delta$. If an X-ray pulse of the variable duration started at time $t=t_{b0}+\delta$, then the energy spectrum of the pulse depends exponentially on the pulse duration. This energy dependence on time is minimized by reducing the amplitude of energy deviation from SS level that in turn can be achieved by adjusting the time of injection of the beam pulse.

An example of quantitative characterization of beam energy variation is provided below.

Average electron beam energy per pulse is used for deriving interdependence of beam energy variation and timing parameters of the beam.

Integrating equation (12) over the pulse duration (with limits $t=[t_{b0}+\delta, t_{b0}+\delta+t_p]$), an average normalized absolute energy deviation from steady state value during the pulse duration $t_p$ due to injection time deviation from optimal time $t_{b0}$ can be expressed by equation:

$$\overline{\Delta W_n} = \frac{2\sqrt{\beta}}{1+\beta} \cdot \frac{\tau}{t_p} \cdot \exp\left(-\frac{t_{b0}}{\tau}\right) \cdot \left(\exp\left(-\frac{\delta}{\tau}\right) - 1\right) \cdot \left(\exp\left(-\frac{t_p}{\tau}\right) - 1\right) \tag{14}$$

The average energy deviation depends on three timing parameters: the value of optimum delay $t_{b0}$, the deviation from optimum delay $\delta$, and pulse duration $t_p$. The relative energy deviation is given by:

$$\overline{\delta W_n} = \frac{\overline{\Delta W_n}}{W_{nSS}} \tag{15}$$

Figure 15:
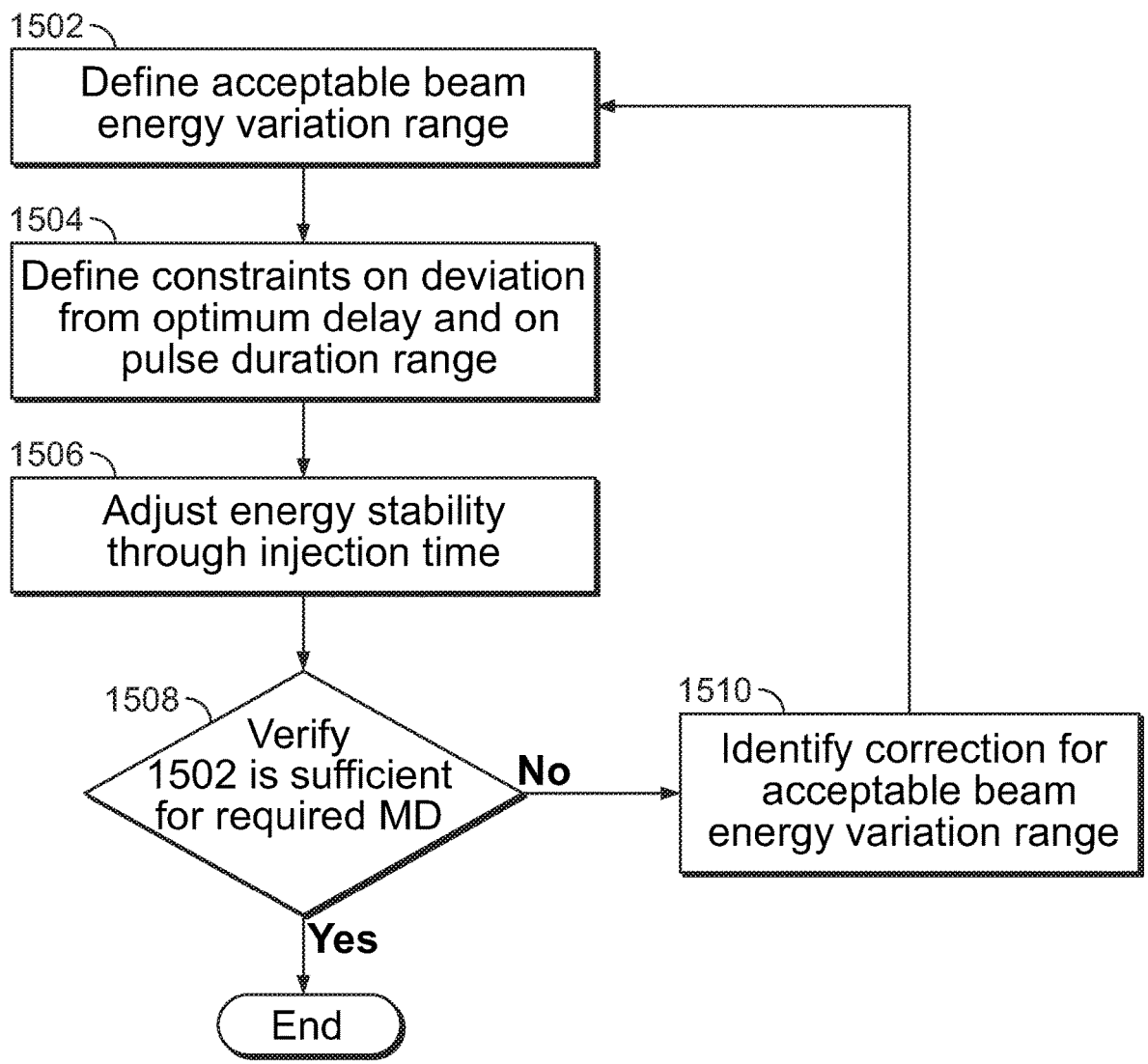
FIG. 15 is a flow chart illustrating an exemplary process for assessing an acceptable range of parameters and refining the requirements for dual-energy discrimination with dynamic dose control, in accordance with some embodiments of the present specification.

The requirements for energy stability, as part of dual-energy material discrimination, depend on multiple specific factors derived from both hardware, algorithm and software tools used. FIG. 15 is a flow chart illustrating an exemplary set of steps for assessing the requirements for dual-energy material discrimination with dynamic dose control. At step 1502, an acceptable energy variation may be defined based on specifics of material discrimination method and hardware. In an embodiment, it is assumed that for successful material discrimination, the relative energy deviation should be within ±1%. Therefore, this requirement determines the range and interdependence of timing parameters sufficient to maintain the relative energy variation within requested limit (of 1%) while employing dynamic dose variation.

Figure 16:
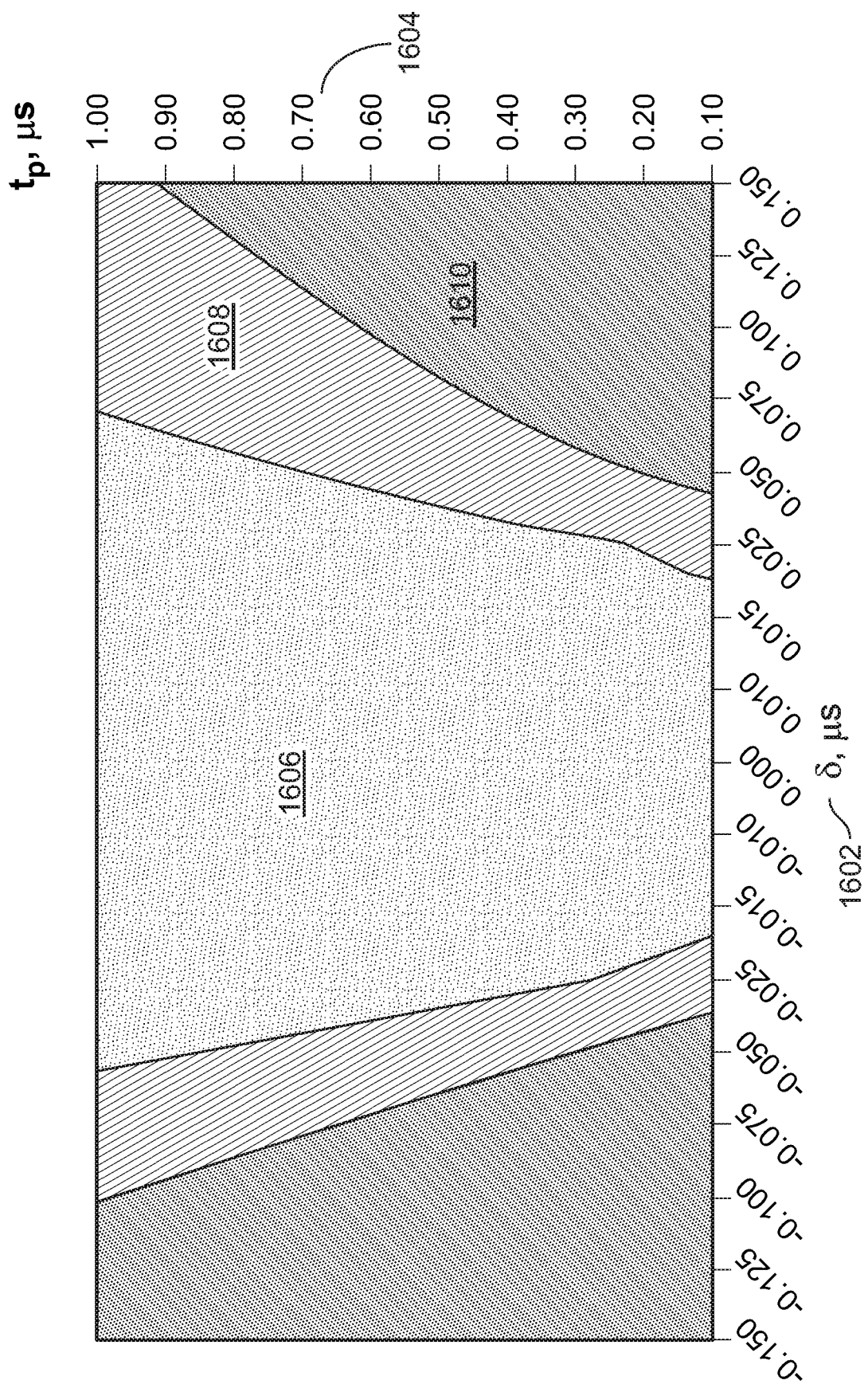
FIG. 16 is a graph illustrating a plot of average per pulse relative energy deviation from steady state value against pulse duration and injection time error, typical for low energy, in accordance with some embodiments of the present specification.
Figure 17:
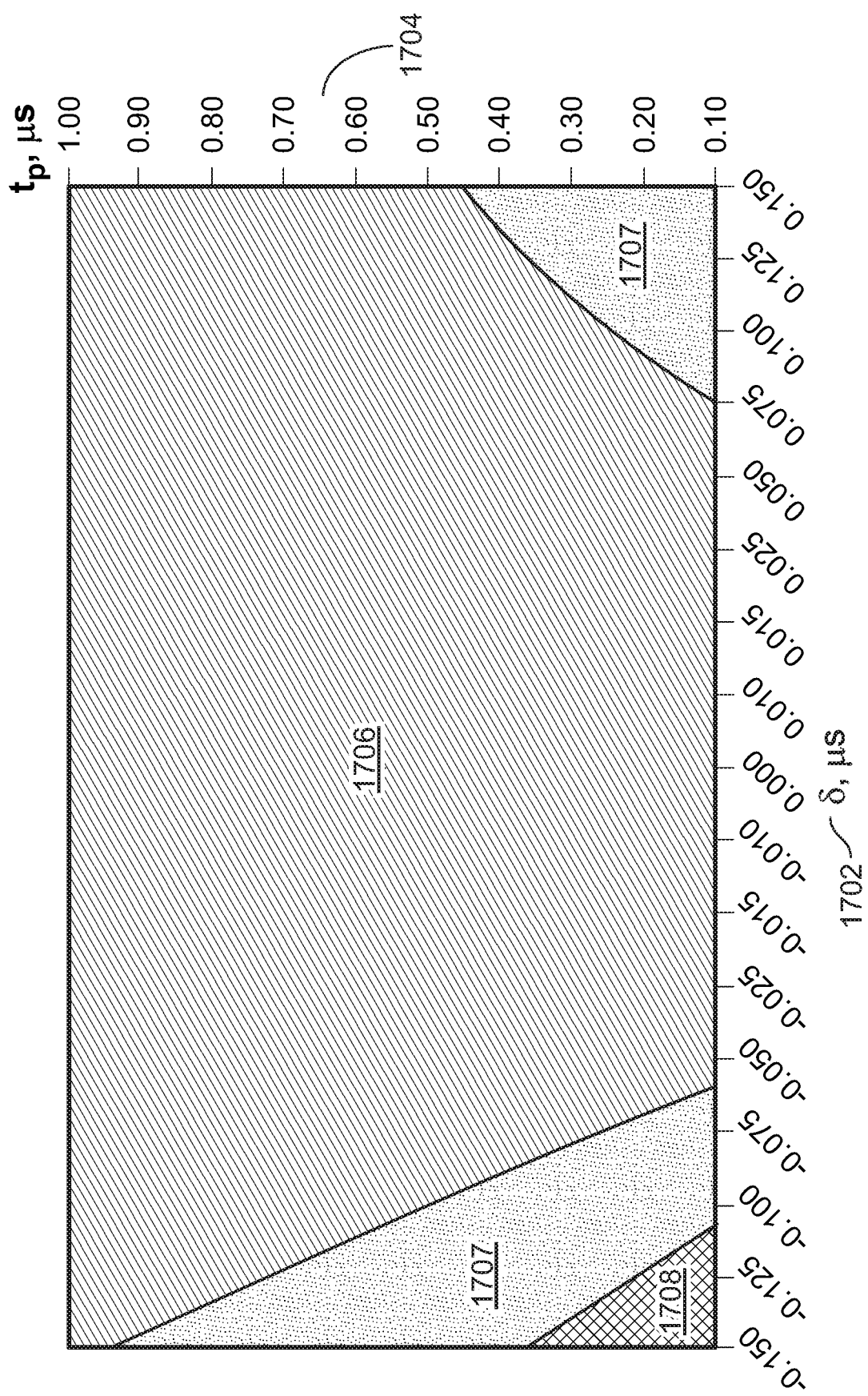
FIG. 17 is a graph illustrating a plot of average per pulse relative energy deviation from steady state value against pulse duration and injection time error, typical for low energy, in accordance with some embodiments of the present specification.

At step 1504, the constraints on deviation from optimum delay ($\delta$) and on pulse duration ($t_p$) range may be defined. Optimum delay $t_{b0}$ is "external" timing parameter to this task that is mainly defined by energy and current of correspondent dual-energy components. Relative energy deviation for two values of optimum delay (considered in an example for single-pulse operation) is illustrated in FIGS. 16 and 17 in the form of surface plots. FIG. 16 is a plot for a low energy component that corresponds to $t_{b0}$=0.5 μs. FIG. 17 is a plot for a high energy component that corresponds to $t_{b0}$=1.0 μs. The horizontal axis 1602/1702 of the charts shown in FIGS. 16 and 17, represents the deviation from optimum delay $\beta$ and the vertical axis 1604/1704 represents the pulse duration $t_p$. Value of relative energy deviation is represented with colors in the FIGS. 16 and 17. The regions in green color 1606 represent relative energy deviation of ≤1%; the regions in yellow color 1608 represent relative energy deviation in a range of (1-2)%; and the regions in red color 1610 represent relative energy deviation of ≥2%. The regions in light green color 1706 represent relative energy deviation of ≤0.5%; the regions in dark green color 1707 represent relative energy deviation of (0.5-1.0)%; region in yellow color 1708 represent relative energy deviation in a range of (1-1.5)%. As it can be seen from the plots of FIGS. 16 and 17, the performance of the material discrimination method is constrained by low energy component. Minimum pulse width is limited by accuracy of adjusting and maintaining injection delay value. For example, to be able to use pulse duration of $t_p$=0.1 μs, the accuracy of adjustments ($\delta$) should not exceed approximately 20 ns. In other words, the accuracy of timing adjustment (including timing jitter) constraints minimum pulse duration at chosen accuracy of energy deviation. High energy component requirements are less restrictive and do not impose additional challenges on dual energy material discrimination performance with dynamic dose variation.

At step 1506, energy stability may be adjusted and controlled by adjusting and maintaining injection time within required boundaries, determined at step 1504. At step 1508, the actual performance of material discrimination may be verified for a given set of hardware and software against requirements for material discrimination and dose variation with further corrections of the acceptable beam energy variation range at step 1510 and reiterating requirements assessment process.

In some embodiments, tools are used for the purpose of adjusting and controlling the energy stability. In embodiments, the tools for direct measuring of the beam energy may be used to measure an instant or an average per pulse energy value, for the monitoring, correction or adjustment of energy deviation. Since average per pulse energy is chosen as primary parameter for defining the limitation on energy deviation, the accuracy of adjustments is linear to required deviation. The values and accuracy of adjustments (and required deviation) are defined by equations (12), (13), (14) and (15).

Industrial linacs may not have a built-in beam energy measurement tool. In this case, reflected power ($P_{Refl}$) is used as a tool for monitoring microwave processes in standing wave cavity and adjusting necessary parameters. Reflected power is a relatively more sensitive parameter of measuring necessary adjustment since $\delta P_{Refl} \sim W^2$. Significant advantage of using $P_{Refl}$ for monitoring and correcting energy deviation is that $P_{Refl}$ signal (waveform) provides a "live signal" of the RF-field in the accelerating cavity (including beam loading). This signal needs very little processing.

In some cases, X-ray beam intensity (D) may be an even more relatively sensitive tool for adjustment/control of beam energy since $\delta D \sim W^{2.7}$.

Sensitivity of these three parameters—$\delta W$; $P_{Refl}$; and D—may be summarized with the equation below:

$$\delta W : \delta P_{Refl} : \delta D = W : W^2 : W^{2.7} \quad (16)$$

The plots like the ones in FIGS. 16 and 17, for reflected power ($P_{Refl}$) and X-ray beam intensity/dose rate (D) deviation, would look the same if the number assigned to the colors are scaled as in equation (16).

Figure 18:
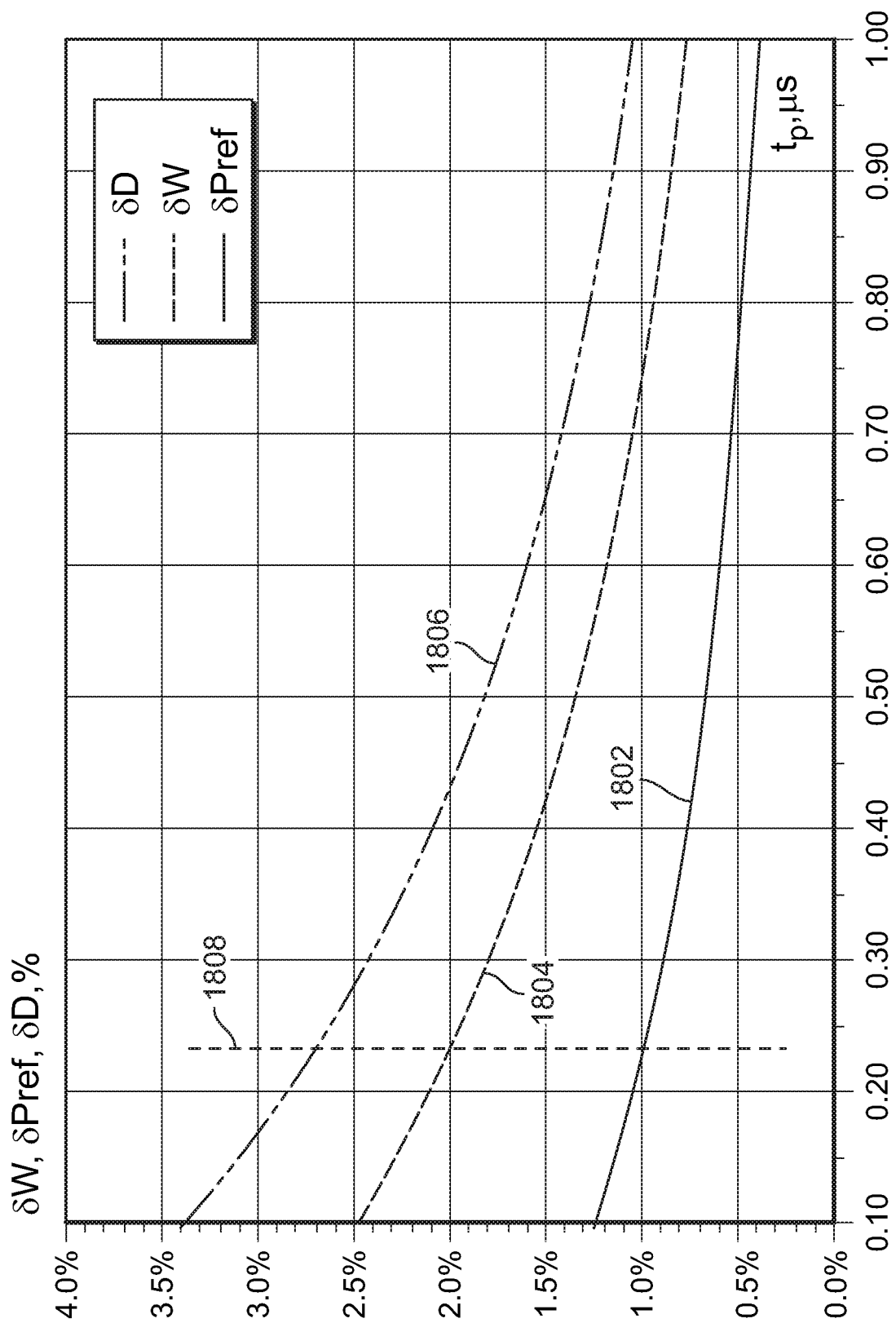
FIG. 18 is an exemplary graph illustrating how to choose acceptable range of parameters for use in material discrimination with dynamic dose control, in accordance with some embodiments of the present specification.

FIG. 18 is an exemplary graph illustrating how to choose acceptable range of parameters for use in material discrimination with dynamic dose control, in accordance with some embodiments of the present specification. The graph illustrates relative energy ($\delta W$) 1802, reflected power ($\delta P_{Refl}$) 1804, and dose rate ($\delta D$) 1806 deviation from corresponding steady state values, versus pulse duration for low energy component ($t_{b0}$ 0.5μ) and optimal delay deviation of $\delta$=25 ns. From the graph, it is seen that the minimum pulse duration that satisfies the range of beam energy deviation $\delta W \leq 1\%$, is $t_{pmin} \approx 0.24$ μs. Line 1808 illustrates an acceptable deviation value of reflected power ($P_{Refl} \leq 2\%$) and dose rate ($\delta D \leq 2.7\%$) to maintain $\delta W \leq 1\%$.

Figure 19:
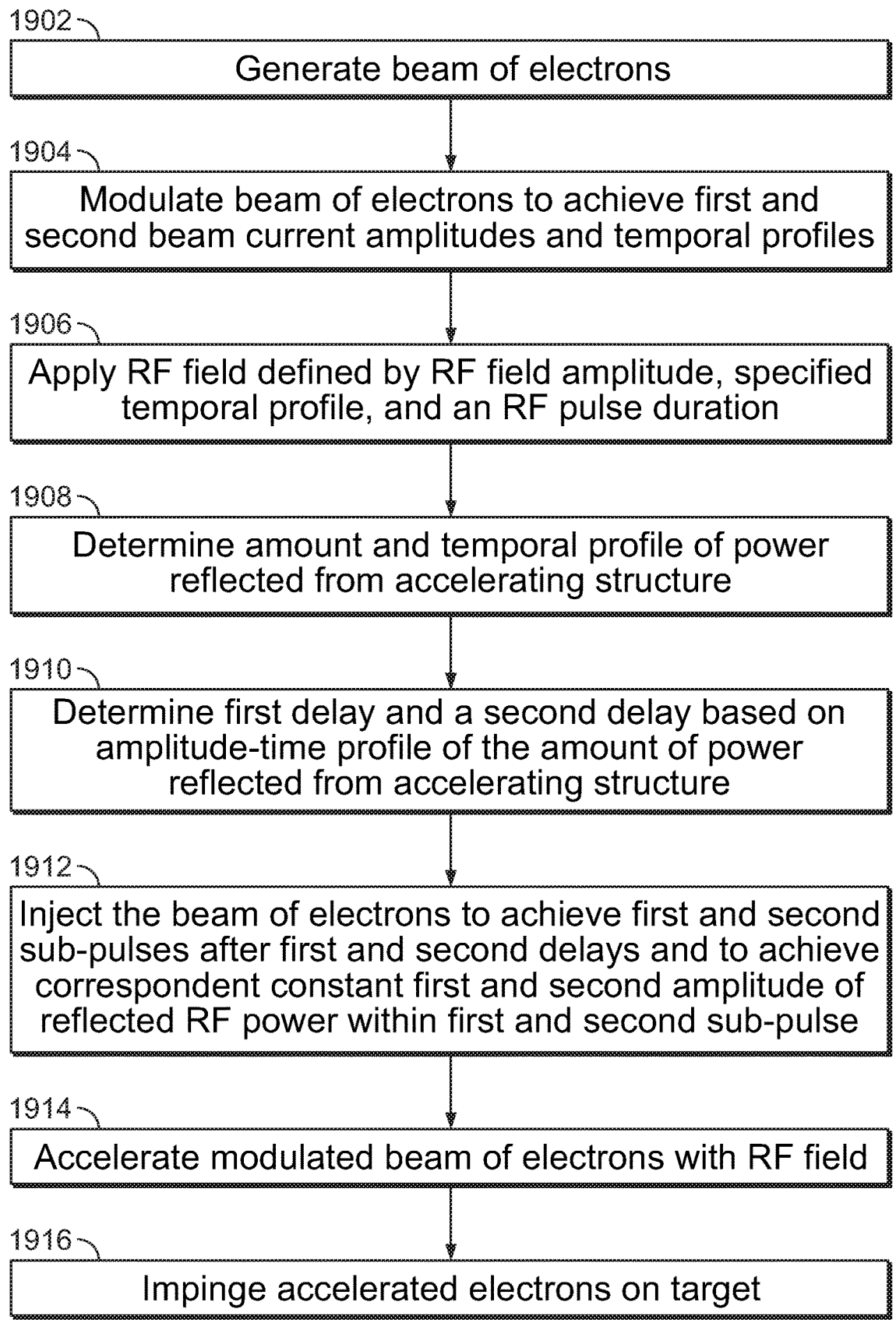
FIG. 19 is a flow chart illustrating an exemplary process of generating a multiple-energy X-ray pulse, in accordance with some embodiments of the present specification.

FIG. 19 is a flow chart illustrating an exemplary process of generating a multiple-energy X-ray pulse, in accordance with some embodiments of the present specification. At 1902, a beam of electrons is generated with an electron gun. The beam of electrons is characterized by an electron beam pulse duration. At 1904, the generated beam of electrons is modulated to achieve at least a first beam current amplitude and a first beam current temporal profile and a second beam current amplitude and a second beam current temporal profile, prior to injection into an accelerating structure. In embodiments, the accelerating structure comprises a standing wave resonator. In embodiments, a coupling coefficient for the accelerating structure is optimized to achieve greater than critical coupling ($\beta_c > 1$, also $\beta_c \geq \beta_0$) at any beam current. At 1906, a radio frequency (RF) field is applied to the accelerating structure. The RF field is defined by an RF field amplitude, a specified temporal profile, and an RF pulse duration. At 1908, a temporal profile of power reflected from the accelerating structure is determined. In embodiments, a detector is used to determine the temporal profile of power reflected from the accelerating structure to generate values indicative of amounts of reflected power ($P_{Refl}$). The detector may include a directional coupler and a microwave detector. At 1910, a first delay and a second delay are determined for injecting the current pulses. The delays are determined based, at least in part, on the temporal profile of the amount of power reflected from the accelerating structure. In some embodiments, methods described in context of FIG. 15 are used to determine the delays.

At 1912, the modulated beam of electrons at the first beam current amplitude is injected after the first delay to achieve a first sub-pulse. Then, the second beam current pulse with the second beam current amplitude is injected after the second delay to achieve a second sub-pulse. In embodiments, a controller is configured to perform the injection of modulated beam of electrons. The beam current pulses are injected to achieve a first steady state energy level of electrons for the first sub-pulse and a second steady state energy level of electrons for the second sub-pulse, where the first and the second steady state energy levels are different. Also, the first and the second beam current pulses are injected within the occurrence of a single RF pulse. In some embodiments, and as described in context of FIGS. 15-18, injecting of the modulated beam of electrons is performed at a time that is based, at least in part, on achieving, during the first sub-pulse, a minimized deviation of energy level relative to the first energy steady state level and on achieving, during the second sub-pulse, a minimized deviation of energy level relative to the second energy steady state level. In embodiments, a duration of the first sub-pulse is different from a duration of the second sub-pulse. Duration of either the first sub-pulse or the second sub-pulse is variable. Minimum duration of any sub-pulse may be zero and the maximum duration may be defined by a function of the RF pulse duration, a time delays for the injecting of the modulated beams of electrons, and durations of one or more other sub-pulses.

In some embodiments, the modulated beam of electrons is injected at a time that is based, at least in part, on achieving, during the first sub-pulse and during the second sub-pulse, a minimized deviation of reflected power ($P_{Refl}$) from the accelerating structure relative to a steady state level of reflected power magnitude during each sub-pulse. In some embodiments, the modulated beam of electrons is injected at a time that is based, at least in part, on achieving, during the first sub-pulse and during the second sub-pulse, a minimized deviation of a normalized on the pulse duration X-ray beam intensity for the first and second sub-pulses, respectively, relative to an X-ray beam intensity corresponding to the first/second sub-pulse steady state energy level.

At 1914, the modulated beam of electrons is accelerated with the RF field within the accelerating structure to produce accelerated electrons. At 1916, the accelerated electrons impinge upon a target for generating X-rays by Bremsstrahlung.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A method for generating a multiple-energy X-ray pulse using an accelerating structure comprising a standing wave resonator, the method comprising:
generating a beam of electrons with an electron gun;
modulating the beam of electrons prior to injection into the accelerating structure,
wherein modulating the beam of electrons produces at least 1) a first beam current amplitude and a first beam current temporal profile and 2) a second beam current amplitude and a second beam current temporal profile and wherein the beam of electrons is characterized by an electron beam pulse duration;
applying to the accelerating structure a radio frequency field, wherein the radio frequency field is defined by RF field amplitude, a specified temporal profile, and an RF pulse duration;
determining a temporal profile of an amount of power reflected from the accelerating structure;
determining a first delay and a second delay, wherein each of the first delay and second delay is determined based, at least in part, on the temporal profile of the amount of power reflected from the accelerating structure;
injecting the modulated beam of electrons at the first beam current amplitude after the first delay to achieve a first sub-pulse and then at the second beam current amplitude after the second delay to achieve a second sub-pulse, wherein the injecting is configured to achieve a first steady state energy level for the first sub-pulse and a second steady state energy level for the second sub-pulse and wherein the first steady state energy level and the second steady state energy level are different;
accelerating the modulated beam of electrons with the radio frequency field within the accelerating structure to produce accelerated electrons; and
impinging the accelerated electrons upon a target for generating X-rays by Bremsstrahlung.

2. The method of claim 1, further comprising optimizing a coupling coefficient for the accelerating structure, wherein the coupling coefficient is optimized to achieve greater than critical coupling at any beam current.

3. The method of claim 1, wherein the injecting of the modulated beam of electrons at the first beam current amplitude and then at the second beam current amplitude occurs over a single RF pulse.

4. The method of claim 1, wherein the injecting of the modulated beam of electrons is performed at a time that is based, at least in part, on achieving, during the first sub-pulse, a minimized deviation of energy level relative to the first steady state energy level and on achieving, during the second sub-pulse, a minimized deviation of energy level relative to the second steady state energy level.

5. The method of claim 4, wherein a duration of the first sub-pulse is different from a duration of the second sub-pulse.

6. The method of claim 4, wherein at least one of a duration of the first sub-pulse or a duration of the second sub-pulse is variable, wherein a maximum duration of the first sub-pulse or a maximum duration of the second sub-pulse is defined by a function of the RF pulse duration, a time for the injecting of the modulated beam of electrons, and durations of one or more other sub-pulses.

7. The method of claim 1, wherein the injecting of the modulated beam of electrons is performed at a time that is based, at least in part, on achieving, during the first sub-pulse, a minimized deviation of power magnitude reflected from the accelerating structure relative to a first steady state level of reflected power magnitude and on achieving, during the second sub-pulse, a minimized deviation of power magnitude reflected from the accelerating structure relative to a second steady state level of reflected power magnitude.

8. The method of claim 7, wherein a duration of the first sub-pulse is different from a duration of the second sub-pulse.

9. The method of claim 7, wherein at least one of a duration of the first sub-pulse or a duration of the second sub-pulse is variable, wherein a maximum duration of the first sub-pulse or a maximum duration of the second sub-pulse is defined by a function of the RF pulse duration, a time for the injecting of the modulated beam of electrons, and durations of one or more other sub-pulses.

10. The method of claim 1, wherein the injecting of the modulated beam of electrons is performed at a time that is based, at least in part, on achieving, during the first sub-pulse, a minimized deviation of a normalized X-ray beam intensity, on the electron beam pulse duration, for the first sub-pulse relative to an X-ray beam intensity corresponding to the steady state energy level of the first sub-pulse and on achieving, during the second sub-pulse, a minimized deviation of a normalized X-ray beam intensity, on the electron beam pulse duration, for the second sub-pulse relative to an X-ray beam intensity corresponding to the steady state energy level of the second sub-pulse.

11. The method of claim 10, wherein a duration of the first sub-pulse is different from a duration of the second sub-pulse.

12. The method of claim 10, wherein at least one of a duration of the first sub-pulse or a duration of the second sub-pulse is variable, wherein a maximum duration of the first sub-pulse or a maximum duration of the second sub-pulse is defined by a function of the RF pulse duration, a time for the injecting of the modulated beam of electrons, and durations of one or more other sub-pulses.

13. A system adapted to generate a multiple-energy X-ray pulse, the system comprising:
an electron gun configured to generate a beam of electrons;
a standing wave resonator;
a radio frequency (RF) source configured to apply a RF field to the standing wave resonator, wherein the RF field is characterized by a RF field amplitude, a specified temporal profile, and a RF pulse duration and wherein the standing wave resonator is configured to receive and accelerate the beam of electrons with the RF field to produce accelerated electrons;
at least one detector configured to generate data indicative of a temporal profile of an amount of power reflected from the accelerating structure and to generate values indicative of amounts of reflected power;
a controller configured to 1) receive the values indicative of the amounts of reflected power from the at least one detector, 2) determine the temporal profile of the amount of reflected power, 3) determine a first delay and a second delay, wherein each of the first delay and second delay is determined based, at least in part, on the temporal profile of the amount of reflected power, and 4) inject the beam of electrons into the standing wave resonator to produce the accelerated electrons and form at least a first sub-pulse defined by a first beam current amplitude and a first RF field amplitude and a second sub-pulse defined by a second beam current amplitude and a second RF field amplitude, wherein the injecting is conducted to achieve a first steady state energy level for the first sub-pulse and a second steady state energy level for the second sub-pulse that are different; and a target configured to receive the accelerated electrons and generate the multiple-energy X-ray pulse.

14. The system of claim 13, wherein the at least one detector comprises a directional coupler and microwave detector.

15. The system of claim 13, wherein the controller is configured to inject the beam of electrons at the first beam current amplitude after the first delay to achieve the first sub-pulse and then at the second beam current amplitude after the second delay to achieve the second sub-pulse over a single RF pulse.

16. The system of claim 13, wherein the controller is configured to inject the beam of electrons at a time that is based, at least in part, on achieving, during the first sub-pulse, a minimized deviation of energy level relative to the first steady state energy level and on achieving, during the second sub-pulse, a minimized deviation of energy level relative to the second steady state energy level.

17. The system of claim 16, wherein a duration of the first sub-pulse is different from a duration of the second sub-pulse.

18. The system of claim 16, wherein at least one of a duration of the first sub-pulse or a duration of the second sub-pulse is variable, and wherein a maximum duration of the first sub-pulse or a maximum duration of the second sub-pulse is defined by a function of the RF pulse duration, a time for injecting the beam of electrons, and durations of one or more other sub-pulses.

19. The system of claim 13, wherein the controller is configured to inject the beam of electrons at a time that is based, at least in part, on achieving, during the first sub-pulse, a minimized deviation of power magnitude reflected from the standing wave resonator relative to a first steady state level of reflected power magnitude and on achieving, during the second sub-pulse, a minimized deviation of power magnitude reflected from the standing wave resonator relative to a second steady state level of reflected power magnitude.

20. The system of claim 19, wherein a duration of the first sub-pulse is different from a duration of the second sub-pulse.

21. The system of claim 19, wherein at least one of a duration of the first sub-pulse or a duration of the second sub-pulse is variable, and wherein a maximum duration of the first sub-pulse or a maximum duration of the second sub-pulse is defined by a function of the RF pulse duration, a time for injecting of the beam of electrons, and durations of one or more other sub-pulses.

22. The system of claim 13 wherein the controller is configured to inject the beam of electrons at a time that is based, at least in part, on achieving, during the first sub-pulse, a minimized deviation of a normalized X-ray beam intensity, on the electron beam pulse duration, for the first sub-pulse relative to an X-ray beam intensity corresponding to the steady state energy level of the first sub-pulse and on achieving, during the second sub-pulse, a minimized deviation of a normalized X-ray beam intensity, on the electron beam pulse duration, for the second sub-pulse relative to an X-ray beam intensity corresponding to the steady state energy level of the second sub-pulse.

23. The system of claim 22, wherein a duration of the first sub-pulse is different from a duration of the second sub-pulse.

24. The system of claim 22, wherein at least one of a duration of the first sub-pulse or a duration of the second sub-pulse is variable, and wherein a maximum duration of the first sub-pulse or a maximum duration of the second sub-pulse is defined by a function of the RF pulse duration, a time for injecting of the beam of electrons, and durations of one or more other sub-pulses.

25. A system adapted to generate an X-ray pulse comprising at least a first sub-pulse and a second sub-pulse, the system comprising:

an electron gun configured to generate a beam of electrons;

a standing wave resonator;

a radio frequency (RF) source configured to apply a RF field to the standing wave resonator, wherein the RF field is characterized by an amplitude, a temporal profile, and a pulse duration and wherein the standing wave resonator is configured to receive and accelerate the beam of electrons using the RF field to produce accelerated electrons;

at least one detector configured to generate data indicative of an amount of power reflected from the accelerating structure;

a controller configured to 1) receive the data indicative of the amount of reflected power, 2) determine a temporal profile of the amount of reflected power, 3) determine a first delay and a second delay, wherein each of the first delay and second delay is determined based, at least in part, on the temporal profile of the amount of reflected power, and 4) inject the beam of electrons into the standing wave resonator to produce the accelerated electrons and form at least a first sub-pulse and a second sub-pulse, wherein the injecting is conducted such that a first steady state energy level is achieved for the first sub-pulse and a second steady state energy level is achieved for the second sub-pulse, and wherein the first steady state energy level and the second steady state energy level are different; and a target configured to receive the accelerated electrons and generate the multiple-energy X-ray pulse.

26. The system of claim 25, wherein the first sub-pulse defined by a first beam current amplitude and a first RF field amplitude and the second sub-pulse defined by a second beam current amplitude and a second RF field amplitude.

27. The system of claim 26, wherein the controller is configured to inject the beam of electrons at the first beam current amplitude after the first delay to achieve the first sub-pulse and then at the second beam current amplitude after the second delay to achieve the second sub-pulse over the X-ray pulse.

28. The system of claim 25, wherein the at least one detector comprises a directional coupler and microwave detector.

29. The system of claim 25, wherein the controller is configured to inject the beam of electrons at a time that is based, at least in part, on achieving, during the first sub-pulse, a minimized deviation of energy level relative to the first steady state energy level and on achieving, during the second sub-pulse, a minimized deviation of energy level relative to the second steady state energy level.

30. The system of claim 29, wherein a duration of the first sub-pulse is different from a duration of the second sub-pulse.

31. The system of claim 29, wherein at least one of a duration of the first sub-pulse or a duration of the second sub-pulse is variable, wherein a maximum duration of the first sub-pulse or a maximum duration of the second sub-pulse is defined by a function of at least one of a RF pulse duration, a time for injecting the beam of electrons, or durations of one or more sub-pulses other than the first or second sub-pulse.

32. The system of claim 25, wherein the controller is configured to inject the beam of electrons at a time that is based, at least in part, on achieving, during the first sub-pulse, a minimized deviation of power magnitude reflected from the standing wave resonator relative to a first steady state level of reflected power magnitude and on achieving, during the second sub-pulse, a minimized deviation of power magnitude reflected from the standing wave resonator relative to a second steady state level of reflected power magnitude.

33. The system of claim 25, wherein the controller is configured to inject the beam of electrons at a time that is based, at least in part, on achieving, during the first sub-pulse, a minimized deviation of a normalized X-ray beam intensity for the first sub-pulse relative to an X-ray beam intensity corresponding to the steady state energy level of the first sub-pulse and on achieving, during the second sub-pulse, a minimized deviation of a normalized X-ray beam intensity for the second sub-pulse relative to an X-ray beam intensity corresponding to the steady state energy level of the second sub-pulse.

34. The system of claim 33, wherein a duration of the first sub-pulse is different from a duration of the second sub-pulse.

35. The system of claim 33, wherein at least one of a duration of the first sub-pulse or a duration of the second sub-pulse is variable, wherein a maximum duration of the first sub-pulse or a maximum duration of the second sub-pulse is defined by at least one of a function of a RF pulse duration, a time for injecting of the beam of electrons, or durations of one or more other sub-pulses other than the first or second sub-pulse.

* * * * *